(12) United States Patent
Rohithakshappa et al.

(10) Patent No.: US 11,556,444 B1
(45) Date of Patent: Jan. 17, 2023

(54) ELECTRONIC SYSTEM FOR STATIC PROGRAM CODE ANALYSIS AND DETECTION OF ARCHITECTURAL FLAWS

(71) Applicant: BANK OF AMERICA CORPORATION, Charlotte, NC (US)

(72) Inventors: Kadekoppa Kiran Rohithakshappa, Waxhaw, NC (US); Amit Mishra, Chennai (IN); Silpa Edappilly Santhosh, Chennai (IN); Richa Soni, Chennai (IN); Krithika Viswanathan, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/530,986

(22) Filed: Nov. 19, 2021

(51) Int. Cl.
*G06F 9/44* (2018.01)
*G06F 11/34* (2006.01)
*G06F 8/75* (2018.01)

(52) U.S. Cl.
CPC ............ *G06F 11/3404* (2013.01); *G06F 8/75* (2013.01); *G06F 11/3466* (2013.01)

(58) Field of Classification Search
None
See application file for complete search history.

(56) References Cited

U.S. PATENT DOCUMENTS

| | | | |
|---|---|---|---|
| 6,031,990 A | 2/2000 | Sivakumar et al. | |
| 6,205,407 B1 | 3/2001 | Testa et al. | |
| 6,301,701 B1 | 10/2001 | Walker et al. | |
| 7,478,365 B2 | 1/2009 | West et al. | |
| 7,603,658 B2 | 10/2009 | Subramanian et al. | |
| 7,610,108 B2 | 10/2009 | Boe et al. | |
| 7,810,070 B2 | 10/2010 | Nasuti et al. | |
| 7,958,495 B2 | 6/2011 | Kelso | |
| 8,117,021 B2 | 2/2012 | Atkin et al. | |
| 8,694,540 B1 | 4/2014 | Lin et al. | |
| 8,843,427 B1 | 9/2014 | Lin et al. | |
| 8,862,527 B2 | 10/2014 | Garner | |
| 8,924,938 B2 | 12/2014 | Chang et al. | |
| 9,038,026 B2 | 5/2015 | Chandra et al. | |
| 9,195,570 B2 | 11/2015 | Tripp | |
| 9,329,582 B2 | 5/2016 | Boe et al. | |
| 9,626,283 B1 * | 4/2017 | Zlatnik | G06F 11/3664 |
| 9,658,945 B2 | 5/2017 | Gurfinkel et al. | |
| 10,311,368 B2 | 6/2019 | Lokare et al. | |

(Continued)

*Primary Examiner* — Qamrun Nahar
(74) *Attorney, Agent, or Firm* — Moore & Van Allen PLLC; Vaidehi Bachoti

(57) ABSTRACT

Embodiments of the invention are directed to static program code analysis and detection of architectural flaws. The system provides a rule-based anomaly detection engine structured to capture application logs during construction of technology program code and dynamically detect anti-pattern conflicts to remediate defects in the technology program code. In particular, the system receives a request to perform defect analysis of a first technology program code. In response, the system constructs a first layer transition map based on mapping each of a plurality of first classes associated with the first technology program code to one or more application layers. The system may then determine, via an anomaly detection engine component, one or more anomalies associated with the first technology program code.

20 Claims, 9 Drawing Sheets

(56) References Cited

U.S. PATENT DOCUMENTS

| | | | |
|---|---|---|---|
| 10,642,723 | B1 | 5/2020 | Krishnamoorthy |
| 11,132,279 | B2 | 9/2021 | Radhakrishnan et al. |
| 2002/0091968 | A1 | 7/2002 | Moreaux et al. |
| 2003/0055836 | A1 | 3/2003 | Dubovsky |
| 2004/0073886 | A1 | 4/2004 | Irani |
| 2004/0107415 | A1 | 6/2004 | Melamed et al. |
| 2005/0204343 | A1 | 9/2005 | Kisamore et al. |
| 2006/0085788 | A1 * | 4/2006 | Amir ................ G06F 8/30 718/100 |
| 2007/0022407 | A1 | 1/2007 | Givoni et al. |
| 2007/0234127 | A1 | 10/2007 | Nguyen |
| 2008/0148219 | A1 | 6/2008 | Ousterhout et al. |
| 2008/0270841 | A1 | 10/2008 | Quilter |
| 2012/0284212 | A1 | 11/2012 | Lin et al. |
| 2015/0006148 | A1 | 1/2015 | Goldszmit et al. |
| 2018/0018582 | A1 | 1/2018 | Unsal et al. |
| 2020/0341777 | A1 * | 10/2020 | Kashyn ............ G06F 11/3636 |
| 2022/0222170 | A1 * | 7/2022 | Jones ................ G06F 8/433 |

\* cited by examiner

FIG. 2C

| CLASS FILE 1 232h | CLASS FILE 2 232g | CLASS FILE 3 232a | CLASS FILE 4 232f | CLASS FILE 5 232b | CLASS FILE 6 232d | CLASS FILE 7 232e | CLASS FILE 8 232c |
|---|---|---|---|---|---|---|---|
| "RestInterceptor" | "HelloSession" | "HelloController" | "RequestReader" | "HelloService" | "HelloWorldServiceImpl" | "HelloWorldDAOImpl" | "ResponseMapper" |
| CLASS 1 230h | CLASS 2 230g | CLASS 3 230a | CLASS 4 230f | CLASS 5 230b | CLASS 6 230d | CLASS 7 230e | CLASS 8 230c |
| 1 | | | | | | | |
| | 2 | | | | | | |
| | | 3 | | | | | |
| | | | 4 | | | | |
| | | 5 | | | | | |
| | | | | 6 | | | |
| | | | | | 7 | | |
| | | | | | | 8 | |
| | | | | | 9 | | |
| | | | | | | | 10 |
| | | | | 11 | | | |
| | | 12 | | | | | |

FIRST EXECUTION SEQUENCE 240

200C

ELECTRONIC SYSTEM FOR STATIC PROGRAM CODE ANALYSIS AND DETECTION OF ARCHITECTURAL FLAWS

FIELD OF THE INVENTION

The present invention generally relates to the field of testing and debugging program code. In particular, the novel present invention provides a unique electronic system for system for static program code analysis and detection of architectural flaws. Embodiments of the invention are configured for identifying and remediating defects in program code.

BACKGROUND

Increasingly prevalent computers, mobile phones, smart devices, appliances, and other devices require a variety of programs operating in tandem. However, these programs may comprise errors and defects, which if not identified and corrected in time may lead to malfunctioning of the program itself and/or other related programs and the devices that run them. In particular, large code development endeavors require teams of developers & architects to work on the same code simultaneously or in tandem. However, disparate actions by various systems and individuals on the same program code may result in architectural flaws in the code which may conflict with or break the foundational architecture patterns, and thereby render the final code unusable. Therefore, a need exists for a novel system that overcomes the foregoing shortcomings of conventional system.

The previous discussion of the background to the invention is provided for illustrative purposes only and is not an acknowledgement or admission that any of the material referred to is or was part of the common general knowledge at the priority date of the application.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention comprise systems, methods, and computer program products that address these and/or the foregoing deficiencies of conventional systems, addresses the foregoing identified needs and provides improvements to existing technology by providing an innovative system, method and computer program product for static program code analysis and detection of architectural flaws. The invention provides a rule-based anomaly detection engine structured to capture application logs during construction of technology program code and dynamically detect anti-pattern conflicts to remediate defects in the technology program code. Typically the system comprises: at least one memory device with computer-readable program code stored thereon; at least one communication device; at least one processing device operatively coupled to the first proctor module application and the second proctor module application, the at least one memory device and the at least one communication device. Executing the computer-readable code is configured to cause the at least one processing device to: receive, via an operative communication channel with a user device, a user request to perform defect analysis of a first technology program code; scan a plurality of application session logs to identify a plurality of first application session logs associated with the first technology program code; detect a plurality of first class files in the plurality of first application session logs of the first technology program code based on analyzing the plurality of first application session logs; determine a first execution sequence associated with the first technology program code based on analyzing the plurality of first class files associated with the plurality of first application session logs of the first technology program code; construct a first layer transition map based on mapping each of a plurality of first classes associated with the first technology program code to one or more application layers; transmit the first layer transition map to an anomaly detection engine component; analyze, via the anomaly detection engine component, a first pattern associated with the first technology program code to determine whether the first technology program code comprises anomalies; determine, via the anomaly detection engine component, one or more anomalies associated with the first technology program code in response to detecting that the first pattern is an anti-pattern, wherein the anti-pattern is associated with a defect; and transmit, via the anomaly detection engine component, a validation file comprising the one or more anomalies associated with the first technology program code.

In some embodiments, or in combination with any of the previous embodiments, the invention is further configured to collate the plurality of first application session logs associated with the first technology program code.

In some embodiments, or in combination with any of the previous embodiments, constructing the first layer transition map further comprises: determining the plurality of first classes based on the plurality of first class files associated with the plurality of first application session logs of the first technology program code; determining a class name for each of the plurality of first classes; determining for each first class of the plurality of first classes an associated application layer of the one or more application layers based on at least the class name; and constructing the first layer transition map based on mapping each of the plurality of first classes to one or more application layers.

In some embodiments, or in combination with any of the previous embodiments, the plurality of first class files are associated with the plurality of first classes of the first technology program code.

In some embodiments, or in combination with any of the previous embodiments, the invention is further configured to: determine, via the anomaly detection engine component, a first pattern associated with the first technology program code.

In some embodiments, or in combination with any of the previous embodiments, analyzing the first pattern associated with the first technology program code further comprises: determining a sequence order of each of the plurality of first classes; and validating the sequence order of each of the plurality of first classes.

In some embodiments, or in combination with any of the previous embodiments, determining the one or more anomalies associated with the first technology program code further comprises: validating a sequence order of each of the plurality of first classes; and determining whether the sequence order of each of the plurality of first classes is compatible with a pre-determined layer transition component associated with the anomaly detection engine component.

In some embodiments, or in combination with any of the previous embodiments, determining the one or more anomalies associated with the first technology program code further comprises: detecting that the first pattern is the anti-pattern in response to determining that (i) the validation of the sequence order is unsuccessful, and (ii) the sequence order is not compatible with the pre-determined layer transition component associated with the anomaly detection engine component.

In some embodiments, or in combination with any of the previous embodiments, determining the one or more anomalies associated with the first technology program code further comprises: detecting that the first pattern is the anti-pattern in response to determining that the sequence order is not compatible with the pre-determined layer transition component associated with the anomaly detection engine component.

In some embodiments, or in combination with any of the previous embodiments, the invention is further configured to: transmit, via the operative communication channel with the user device, a dynamic notification to the user indicating the one or more anomalies associated with the first technology program code; in response to a defect correction input from the user, initiate correction of the first technology program code by at least modifying first pattern associated with the first technology program code, thereby constructing a corrected first technology program code; and perform defect analysis of the first technology program code.

In some embodiments, or in combination with any of the previous embodiments, the invention is further configured to: determine a first process function of the one or more process functions associated with each of a plurality of first classes associated with the first technology program code; determine a first type of process function associated with the first process function; and determine for each first class of the plurality of first classes an associated application layer of the one or more application layers based on the associated first type of process function.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
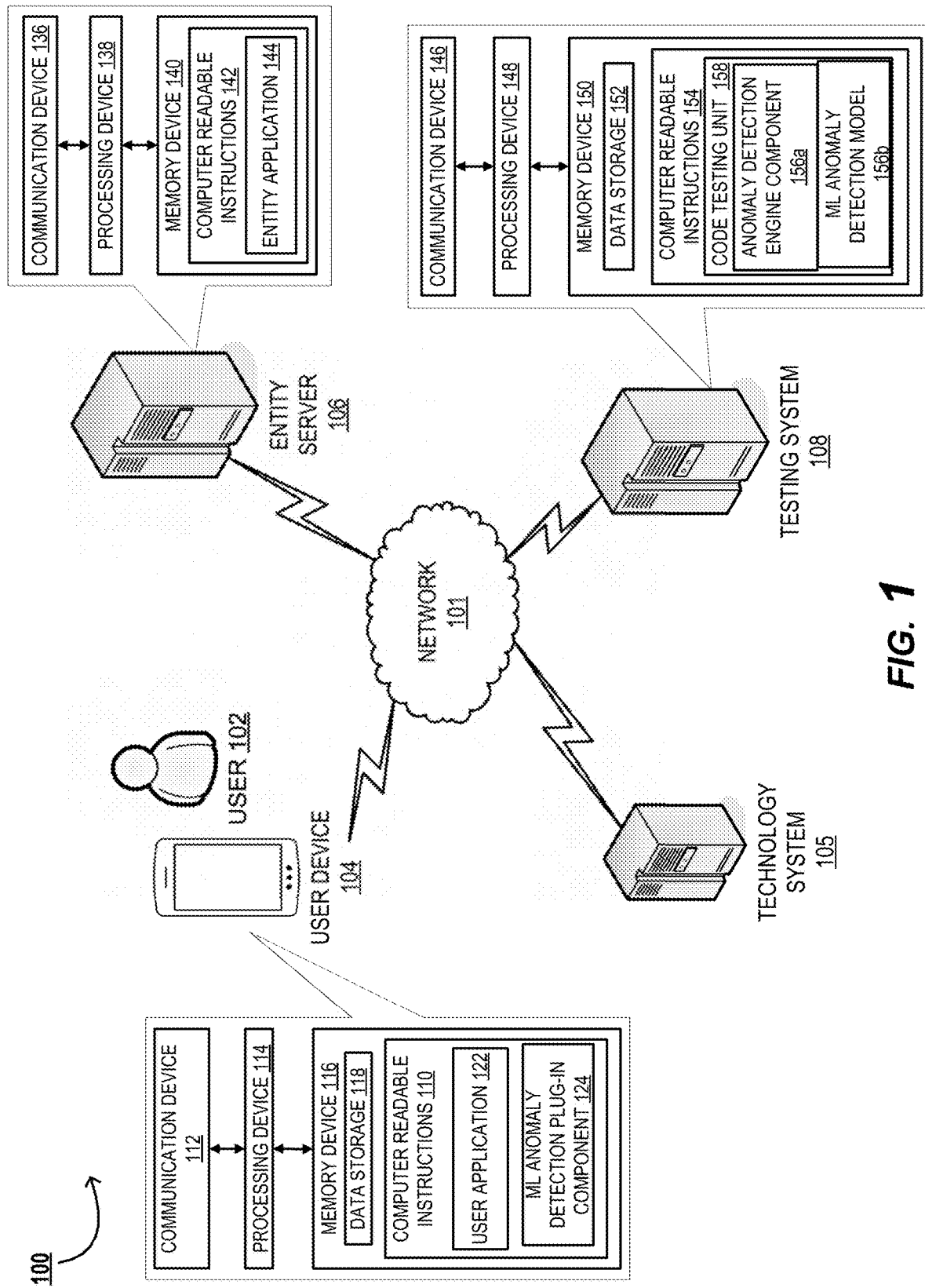
Figure 2A:
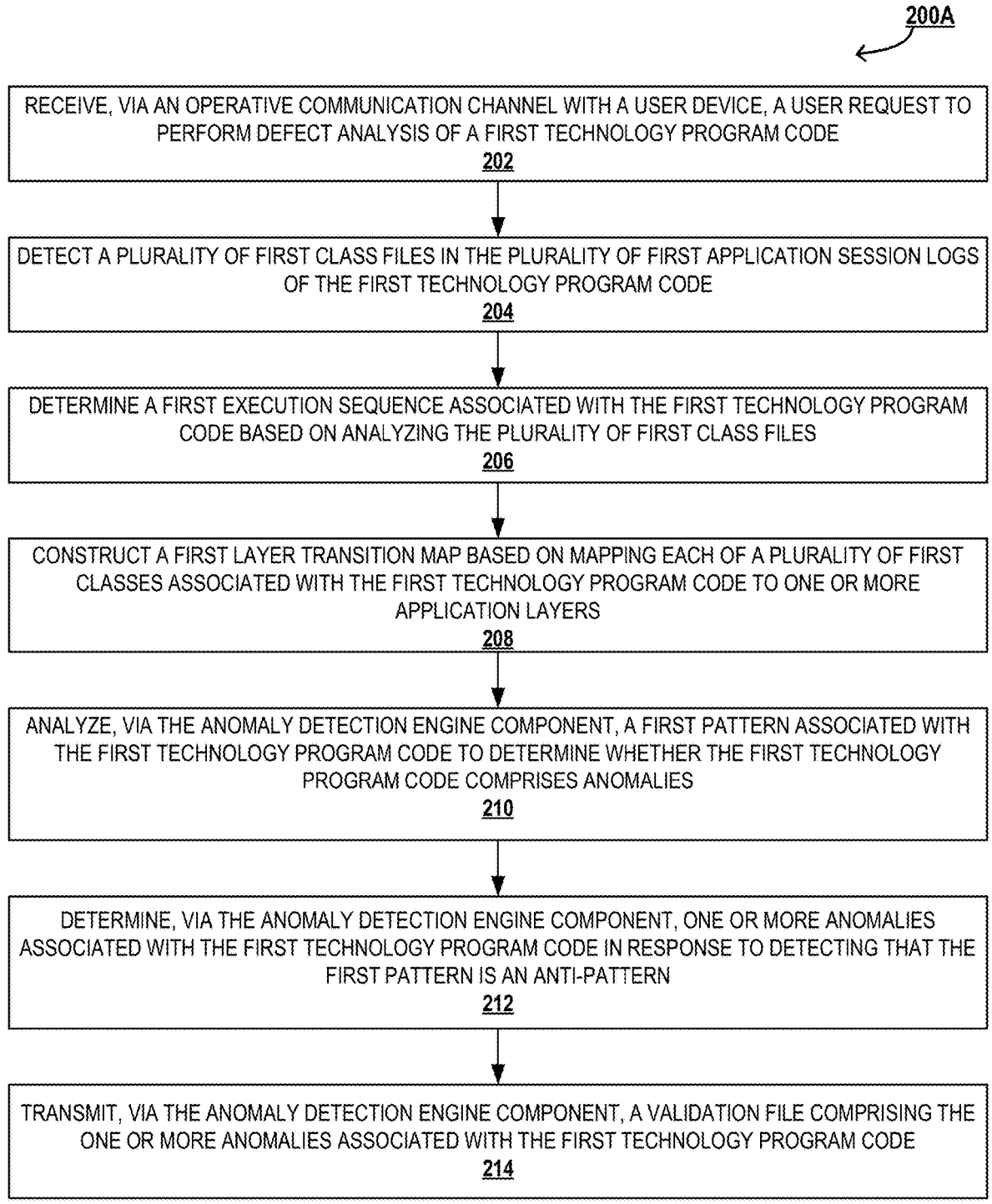
Figure 2B:
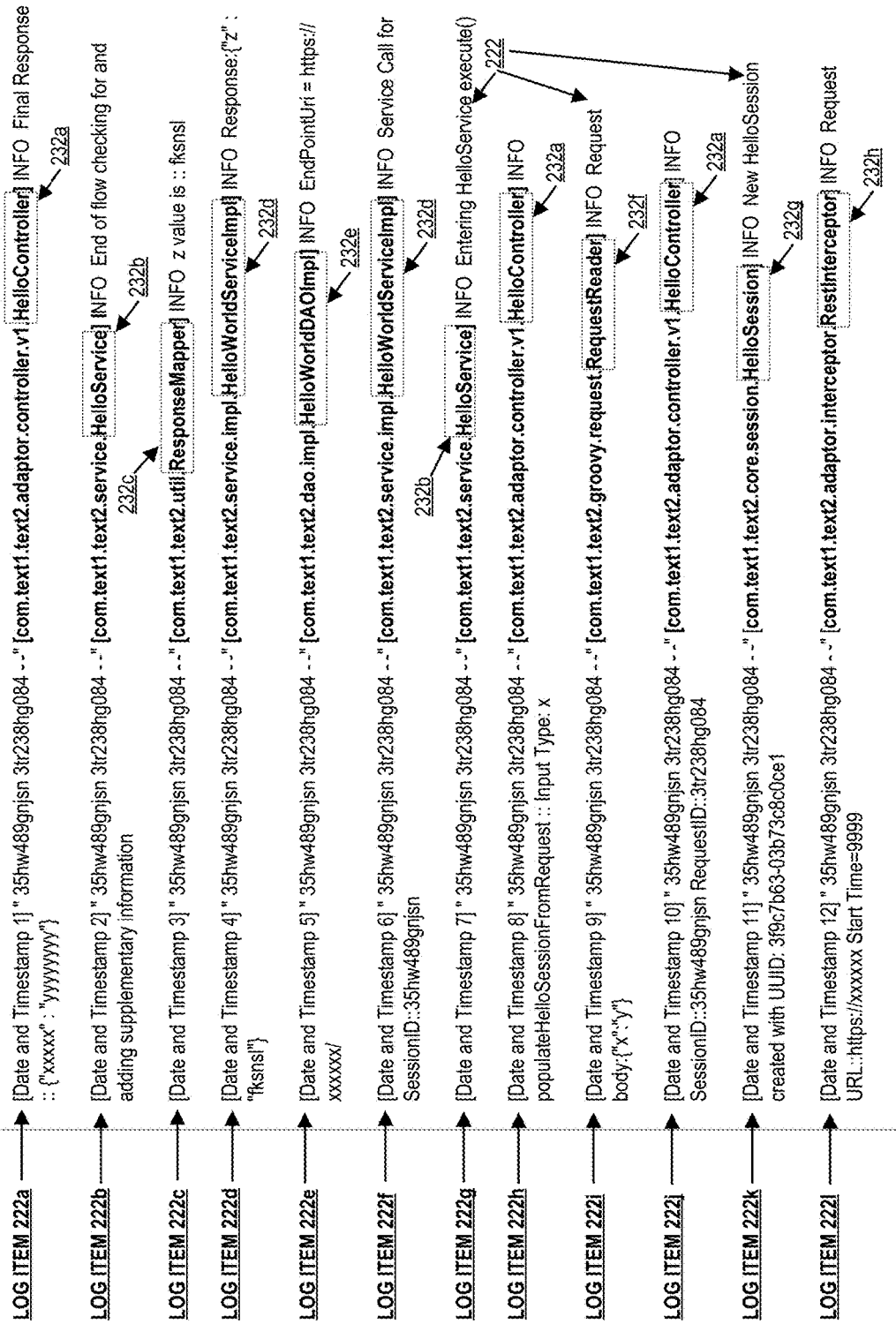
Figure 2D:
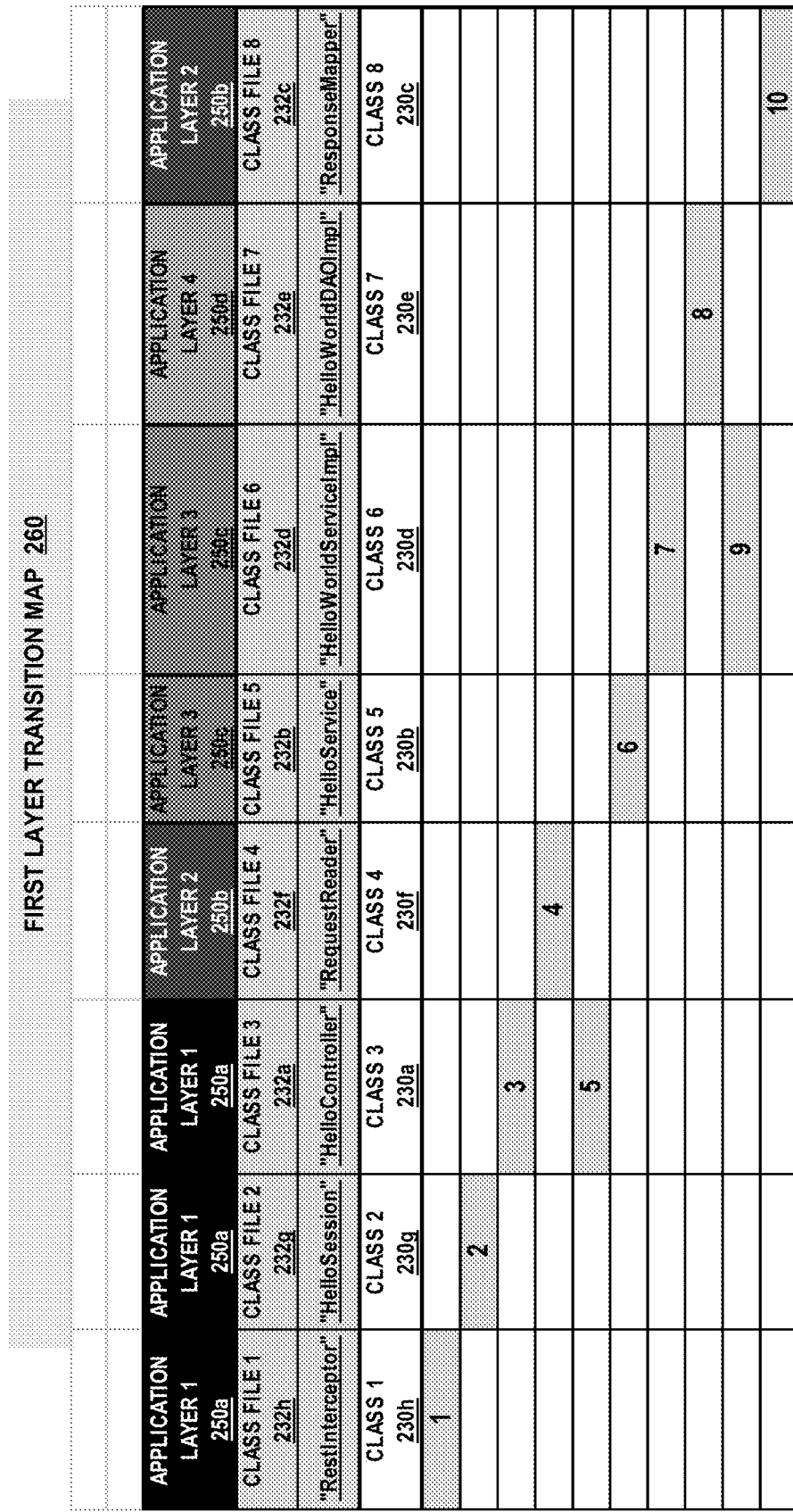
Figure 3A:
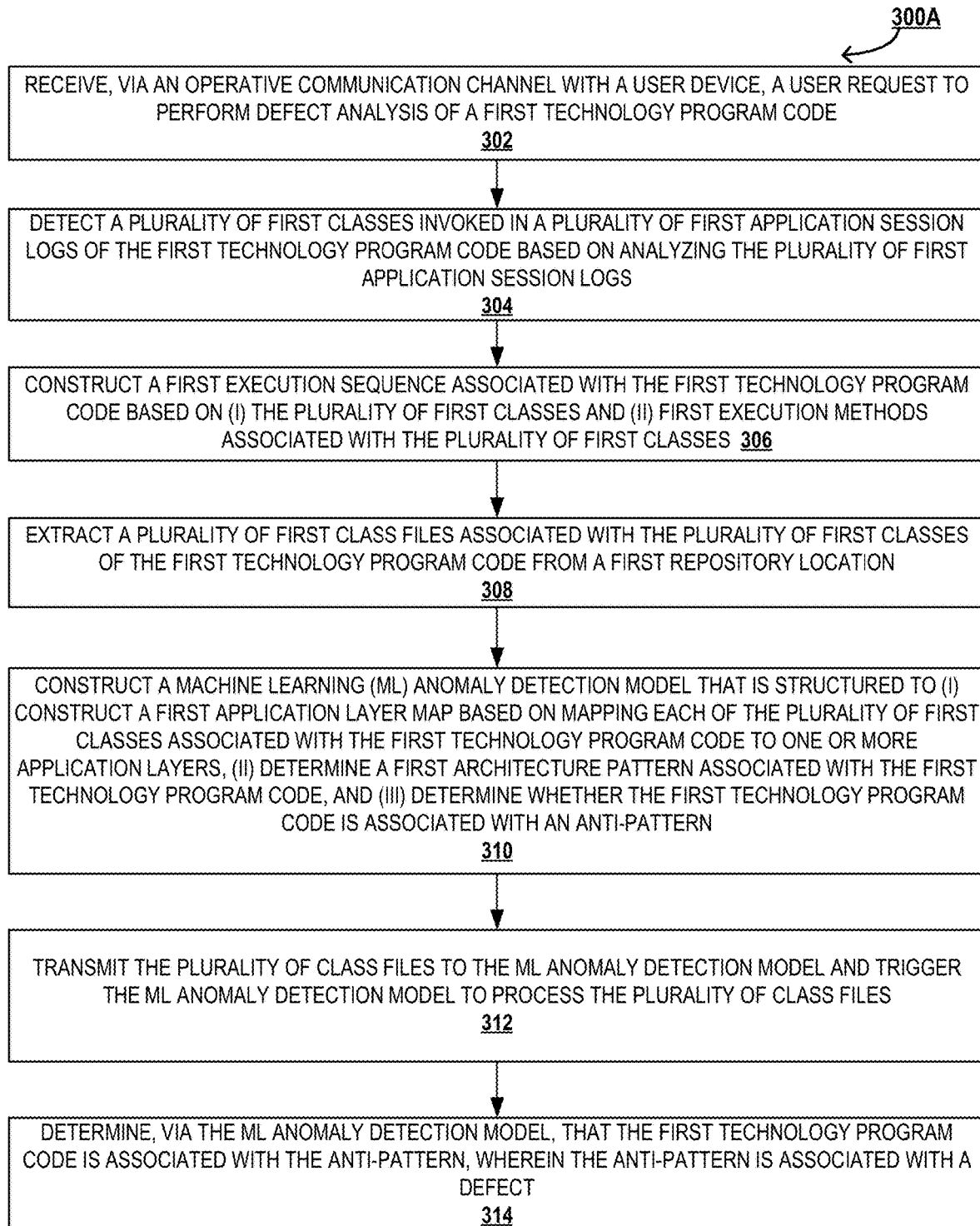
Figure 3B:
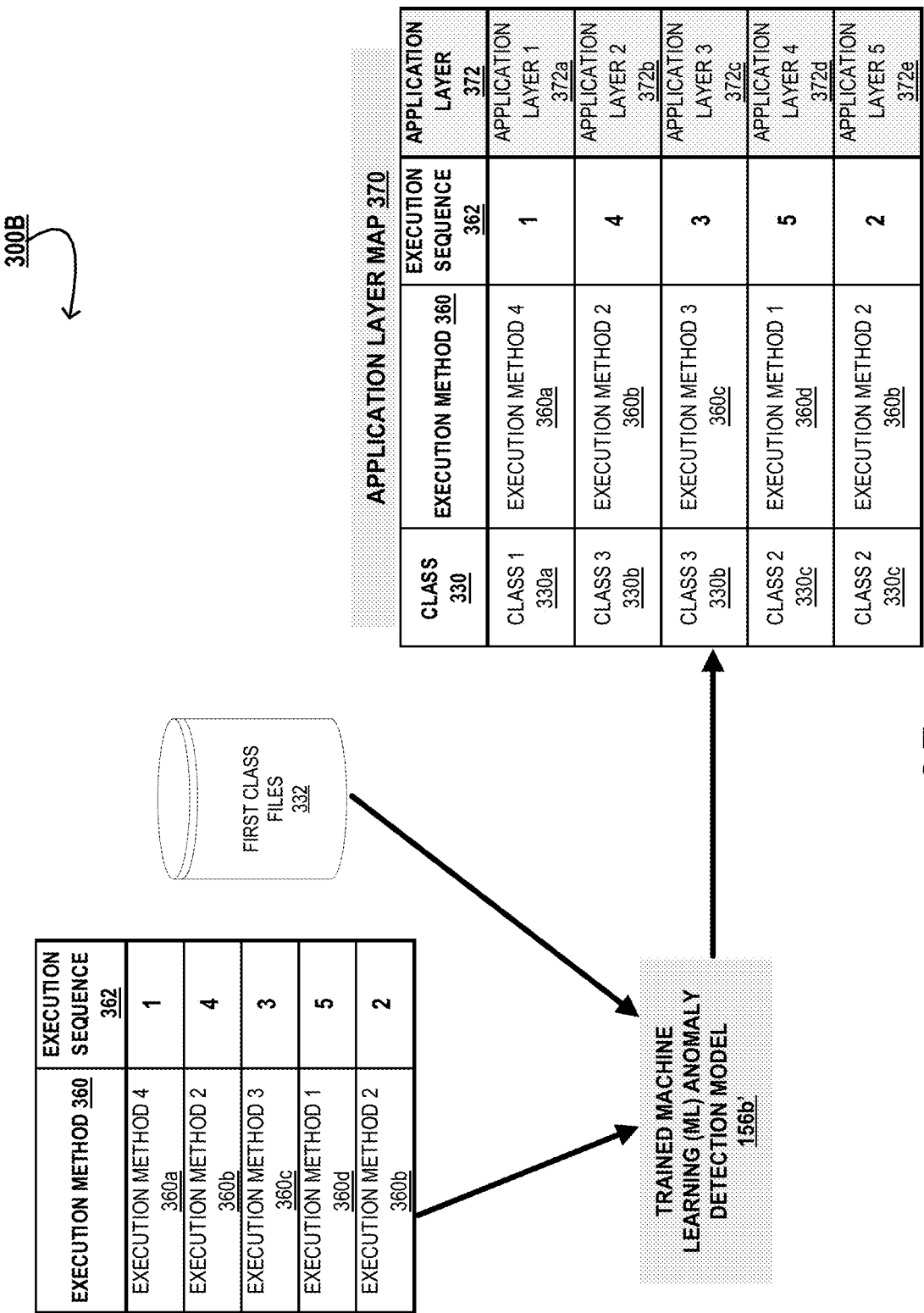
Figure 3C:
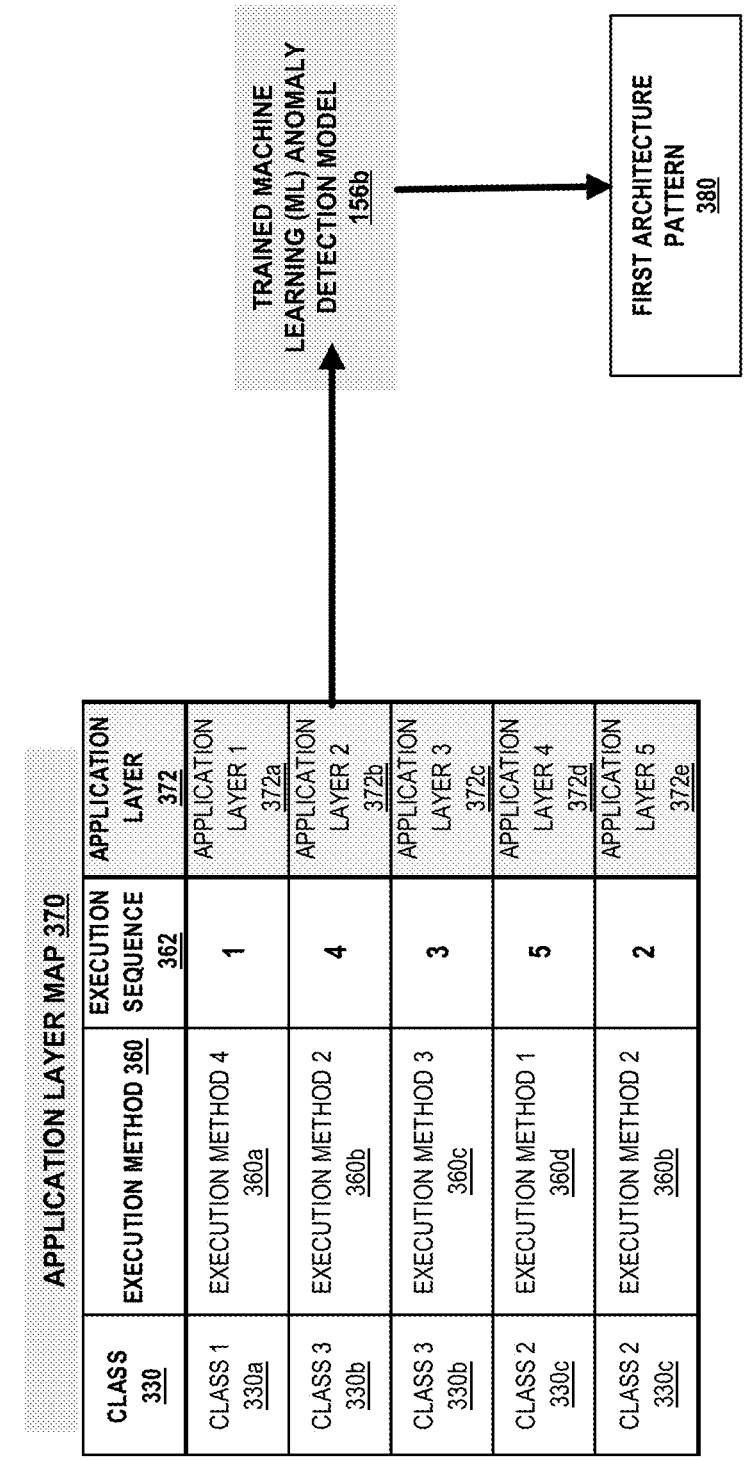
Figure 4:
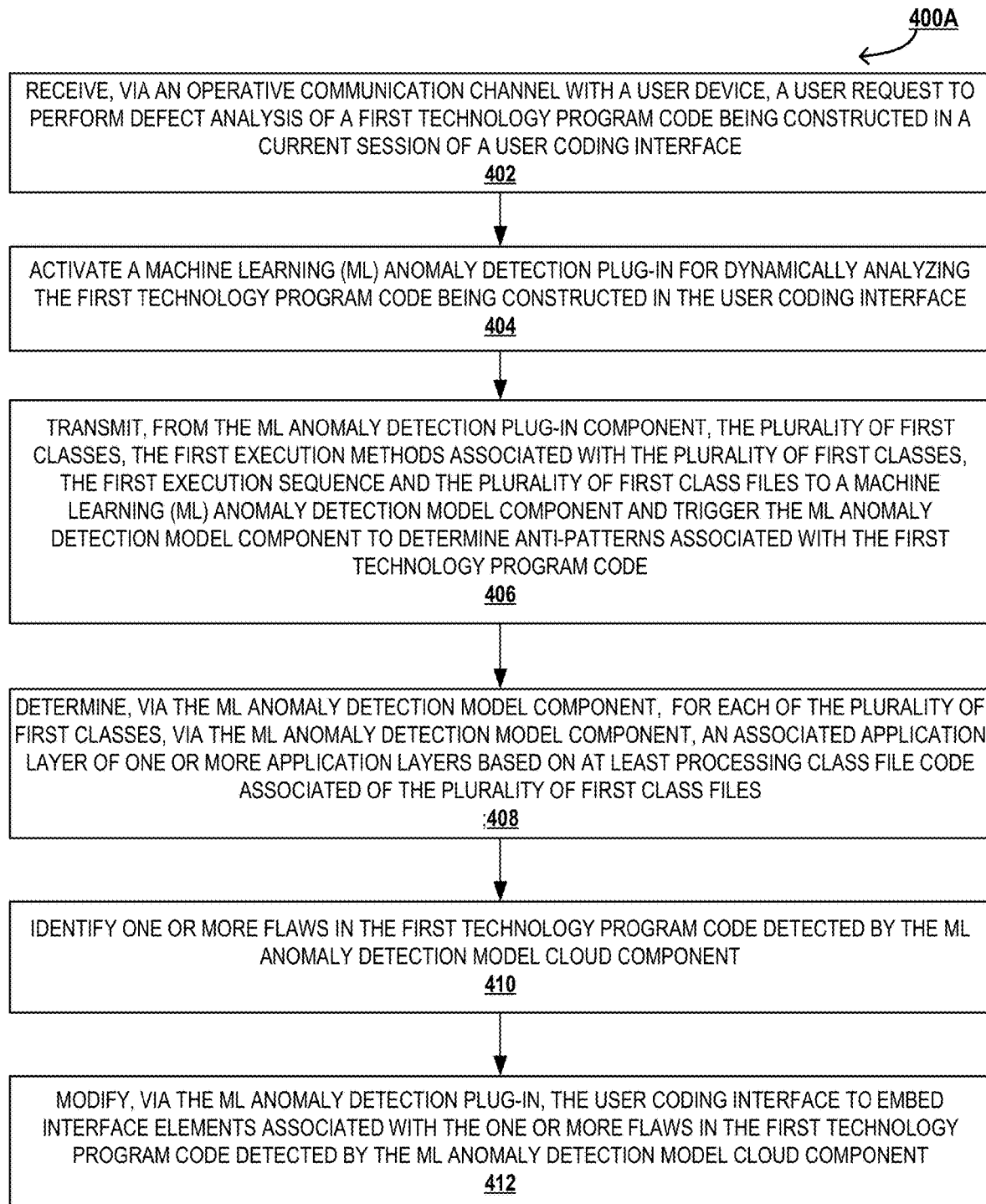

Having thus described embodiments of the invention in general terms, reference will now be made to the accompanying drawings, wherein:

FIG. 1 depicts a code testing system environment 100, in accordance with one embodiment of the present invention;

FIG. 2A depicts a high level process flow 200A for static program code analysis and detection of architectural flaws, in accordance with one embodiment of the present invention;

FIG. 2B depicts a schematic representation 200B of illustrative examples of application session logs of FIG. 2A, in accordance with one embodiment of the present invention;

FIG. 2C depicts a schematic representation 200C of illustrative examples of a first execution sequence of FIG. 2A, in accordance with one embodiment of the present invention;

FIG. 2D depicts a schematic representation 200D of illustrative examples of a layer transition map of FIG. 2A, in accordance with one embodiment of the present invention;

FIG. 3A depicts a high level process flow 300A for machine learning-based anomaly detection in program code, in accordance with one embodiment of the present invention;

FIG. 3B depicts a schematic representation 300B of illustrative examples of constructing and training the ML anomaly detection model of FIG. 3A, in accordance with one embodiment of the present invention;

FIG. 3C depicts a schematic representation 300C of illustrative examples of constructing and training the ML anomaly detection model of FIG. 3A, in accordance with one embodiment of the present invention; and FIG. 4 depicts a high level process flow 400 for active detection and mitigation of anomalies in program code construction interfaces, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

In some embodiments, an "entity" or "enterprise" as used herein may be any institution employing information technology resources and particularly technology infrastructure configured for large scale processing of electronic files, electronic technology event data and records, and performing/processing associated technology activities. In some instances, the entity's technology systems comprise multiple technology applications across multiple distributed technology platforms for large scale processing of technology activity files and electronic records. As such, the entity may be any institution, group, association, financial institution, establishment, company, union, authority or the like, employing information technology resources.

As described herein, a "user" is an individual associated with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer. In other embodiments, a user may be a system performing one or more tasks described herein.

In the instances where the entity is a financial institution, a user may be an individual or entity with one or more relationships affiliations or accounts with the entity (for example, a financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, information associated with the user, or the like. The technology resource is typically associated with and/or maintained by an entity.

As used herein, a "user interface" or "UI" may be an interface for user-machine interaction. In some embodiments the user interface comprises a graphical user interface. Typically, a graphical user interface (GUI) is a type of interface that allows users to interact with electronic devices such as graphical icons and visual indicators such as secondary notation, as opposed to using only text via the command line. That said, the graphical user interfaces are typically configured for audio, visual and/or textual communication. In some embodiments, the graphical user interface may include both graphical elements and text elements. The graphical user interface is configured to be presented on one or more display devices associated with user devices, entity systems, processing systems and the like. In some embodiments the user interface comprises one or more of an adaptive user interface, a graphical user interface, a kinetic user interface, a tangible user interface, and/or the like, in part or in its entirety.

As discussed previously, programs may comprise errors and defects, which if not identified and corrected in time may lead to malfunctioning of the program itself and/or other related programs and the devices that run them. Typically, a particular program may not be correct or may not be performing correctly in cases where the output provided by the program is unexpected or when the output is deficient or faulty.

However, in conventional systems, the testing of program code primarily relies on debugging code and/or data validation. This method typically relies on identifying an error (i.e., an absolute lapse or fault) in the output for even ascertaining that the particular program may not be correct or may not be performing correctly. However, in the instances of machine-learning programs or deep-learning programs, the output and/or the program code is seldom entirely erroneous (i.e., an absolute lapse or fault). Instead, the output and/or code may have low accuracy or lower than optimal accuracy. Here, conventional systems are not structured to identify that the output and/or code are exhibiting low accuracies, much less which functions in the program are causing these low accuracies.

However, these programs may comprise errors and defects, which if not identified and corrected in time may lead to malfunctioning of the program itself and/or other related programs and the devices that run them. In particular, large code development endeavors require teams of developers & architects to work on the same code simultaneously or in tandem might. However, disparate actions by various systems and individuals on the same program code may result in architectural flaws in the code which may conflict with or break the foundational architecture patterns, and thereby render the final code unusable. Even if such code can be run, it could result in cascading issues into the advance stages of the production life cycle. However, in conventional systems, the testing of program code primarily relies on debugging code and/or data validation, only after the entire construction process has been completed. This conventional testing process, however, fails to preclude compound and cascading flaws/defects/errors in the code that may originate from initial errors. Moreover, the conventional testing process is not compatible for testing programs having complex structures that do not lend themselves to the conventional methods. Conventional methods are not configured for identifying root causes of inaccuracies, thereby precluding any accurate/precise corrections of the program code to rectify the defects. Third, the conventional testing processes are heavily reliant on test cases for testing programs, and may not be able to identify defects when other use cases are provided to the program. Moreover, this conventional process while not being reliably accurate is also time intensive and laborious. Therefore, a need exists for a novel system that is configured for effective and systematic testing of the program code itself, identifying root causes of defects and remediating defects, which overcomes the foregoing shortcomings of conventional system, as will be described below.

FIG. 1 illustrates a code testing system environment 100, in accordance with some embodiments of the present invention. As illustrated in FIG. 1, a testing system 108 is in operative communication with and operatively coupled to, via a network 101, a user device 104, an entity server 106, and a technology system 105. In this way, the testing system 108 can send information to and receive information from the user device 104, the entity server 106, and the technology system 105. FIG. 1 illustrates only one example of an embodiment of the system environment 100, and it will be appreciated that in other embodiments one or more of the systems, devices, or servers may be combined into a single system, device, or server, or be made up of multiple systems, devices, or servers. In this way, a code testing unit 158 (also referred to as a code testing unit application 158) of the testing system 108, is configured for static program code analysis and detection of architectural flaws, machine learning-based anomaly detection in program code, and active detection and mitigation of anomalies in program code construction interfaces, as described in detail later on.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

FIG. 1 also illustrates a user system 104. The user device 104 may be, for example, a desktop personal computer, a mobile system, such as a cellular phone, smart phone, personal data assistant (PDA), laptop, a server system, another computing system and/or the like. The user device 104 generally comprises a communication device 112, a processing device 114, and a memory device 116. The user device 104 is typically a computing system that is configured to enable user and device authentication for access to testing data results, request testing of programs, etc. The processing device 114 is operatively coupled to the communication device 112 and the memory device 116. The processing device 114 uses the communication device 112 to communicate with the network 101 and other devices on the network 101, such as, but not limited to, the entity server 106, the testing system 108 and the technology system 105.

As such, the communication device 112 generally comprises a modem, server, or other device for communicating with other devices on the network 101.

The user device 104 comprises computer-readable instructions 110 and data storage 118 stored in the memory device 116, which in one embodiment includes the computer-readable instructions 110 of a user application 122. In some embodiments, the testing system 108 and/or the entity system 106 are configured to cause the processing device 114 to execute the computer readable instructions 110, thereby causing the user device 104 to perform one or more functions described herein, for example, via the user application 122 and the associated user interface of the user application 122. In some embodiments, the user 102 may employ the user application 122 for constructing a first technology program code. Here, the user application 122 may comprise a user coding interface (e.g., in the form of a graphical user interface (GUI)) structured to receive user input, e.g., in the form of characters, text, etc., of the first technology program code (e.g., in the form of lines of the first technology program code). The user application 122 may subsequently compile the code upon receiving a user command. The testing system 108 (e.g., via its processing device 148 upon executing computer readable instructions 154) may transmit, store, install, run, execute, trigger, and/or otherwise control a ML anomaly detection plug-in component 124 at the user device 122. The ML anomaly detection plug-in component 124 is structured to be activated within the user coding interface of the user application 122. Here, the ML anomaly detection plug-in component 124 adds new functionality to the user application 122, and may also control certain functions of the user application 122, while retaining the user within the user coding interface of the user application 122.

As further illustrated in FIG. 1, the testing system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device, such as the processing device 148, typically includes functionality to operate one or more programs and modules (e.g., an anomaly detection engine component 156a, ML anomaly detection model 156b, etc.) of the code testing unit 158 and/or the user device 104 (e.g., the ML anomaly detection plug-in component 124, user application 122, etc.), based on computer-readable instructions thereof, which may be stored in a memory device, for example, executing computer readable instructions 154 or computer-readable program code 154 stored in memory device 150 to perform one or more functions associated with a code testing unit 158

The processing device 148 is operatively coupled to the communication device 146 and the memory device 150. The processing device 148 uses the communication device 146 to communicate with the network 101 and other devices on the network 101, such as, but not limited to the entity server 106, the technology system 105, and the user system 104. As such, the communication device 146 generally comprises a modem, server, or other device for communicating with other devices on the network 101.

As further illustrated in FIG. 1, the testing system 108 comprises the computer-readable instructions 154 stored in the memory device 150, which in one embodiment includes the computer-readable instructions 154 of the code testing unit 158. In some embodiments, the computer readable instructions 154 comprise executable instructions associated with the anomaly detection engine component 156a and ML anomaly detection model 156b of the code testing unit 158, the ML anomaly detection plug-in component 124 stored at the user device 104, wherein these instructions, when executed, are typically configured to cause the applications or modules to perform/execute one or more steps described herein. In some embodiments, the memory device 150 includes data storage 152 for storing data related to the system environment, but not limited to data created and/or used by the code testing unit 158 and its components/modules. In some embodiments, the memory device 150 includes temporary memory locations that are structured to be easily accessible for compiling and running the program. These locations may be employed for temporarily storing the data constructed during various iterations, which are then automatically purged after the particular iteration or after termination of testing, thereby providing effective use of processing and memory resources. The code testing unit 158 is further configured to perform or cause other systems and devices to perform the various steps in testing of program code, as will be described in detail later on.

As such, the processing device 148 is configured to perform some or all of the steps associated with static program code analysis and detection of architectural flaws, machine learning-based anomaly detection in program code, and active detection and mitigation of anomalies in program code construction interfaces described throughout this disclosure, for example, by executing the computer readable instructions 154. In this regard, the processing device 148 may perform one or more steps singularly and/or transmit control instructions that are configured to cause the code testing unit 158 itself, the anomaly detection engine component 156a and ML anomaly detection model 156b of the code testing unit 158, entity server 106, ML anomaly detection plug-in component 124, user device 104, and technology system 105 and/or other systems and applications, to perform one or more steps described throughout this disclosure. Although various testing steps may be described as being performed by the code testing unit 158 and/or its components/applications and the like in some instances herein, it is understood that the processing device 148 is configured to establish operative communication channels with and/or between these modules and applications, and transmit control instructions to them, via the established channels, to cause these module and applications to perform these steps.

Embodiments of the testing system 108 may include multiple systems, servers, computers or the like maintained by one or many entities. FIG. 1 merely illustrates one of those systems 108 that, typically, interacts with many other similar systems to form the information network. In one embodiment of the invention, the testing system 108 is operated by the entity associated with the entity server 106, while in another embodiment it is operated by a second entity that is a different or separate entity from the entity server 106. In some embodiments, the entity server 106 may be part of the testing system 108. Similarly, in some embodiments, the testing system 108 is part of the entity server 106. In other embodiments, the entity server 106 is distinct from the testing system 108.

In one embodiment of the testing system 108, the memory device 150 stores, but is not limited to, the code testing unit 158 comprising the anomaly detection engine component 156a and ML anomaly detection model 156b. In one embodiment of the invention, the code testing unit 158 may associated with computer-executable program code that instructs the processing device 148 to operate the network communication device 146 to perform certain communication functions involving the technology system 105, the user device 104 and/or the entity server 106, as described herein. In one embodiment, the computer-executable program code of an application associated with the code testing unit 158 may also instruct the processing device 148 to perform certain logic, data processing, and data storing functions of the application.

The processing device 148 is configured to use the communication device 146 to receive data, receive requests for program testing, retrieve program code, transmit and/or cause display of outputs/test results and/or the like. In the embodiment illustrated in FIG. 1 and described throughout much of this specification, the code testing unit 158 may perform one or more of the functions described herein, by the processing device 148 executing computer readable instructions 154 and/or executing computer readable instructions associated with one or more application(s)/devices/components of the code testing unit 158.

As illustrated in FIG. 1, the entity server 106 is connected to the testing system 108 and may be associated with a test case database, training database, etc. In this way, while only one entity server 106 is illustrated in FIG. 1, it is understood that multiple network systems may make up the system environment 100 and be connected to the network 101. The entity server 106 generally comprises a communication device 136, a processing device 138, and a memory device 140. The entity server 106 comprises computer-readable instructions 142 stored in the memory device 140, which in one embodiment includes the computer-readable instructions 142 of an institution application 144. The entity server 106 may communicate with the testing system 108. The testing system 108 may communicate with the entity server 106 via a secure connection generated for secure encrypted communications between the two systems for communicating data for processing across various applications.

As further illustrated in FIG. 1, in some embodiments, the technology event processing system environment 100 further comprises a technology system 105, in operative communication with the testing system 108, the entity server 106, and/or the user device 104. Typically, the technology system 105 comprises a communication device, a processing device and memory device with computer readable instructions. In some instances, the technology system 105 comprises a first database/repository comprising test cases, and/or a second database/repository comprising training data (e.g., use/test cases earmarked for training the program (e.g., machine-learning program or another neural network program)). These applications/databases may be operated by the processor executing the computer readable instructions associated with the technology system 105, as described previously. In some instances, the technology system 105 is owned, operated or otherwise associated with third party entities, while in other instances, the technology system 105 is operated by the entity associated with the systems 108 and/or 106. Although a single external technology system 105 is illustrated, it should be understood that, the technology system 105 may represent multiple technology servers operating in sequentially or in tandem to perform one or more data processing operations.

It is understood that the servers, systems, and devices described herein illustrate one embodiment of the invention. It is further understood that one or more of the servers, systems, and devices can be combined in other embodiments and still function in the same or similar way as the embodiments described herein.

In some embodiments, the term "module" or "unit" as used herein may refer to a functional assembly (e.g., packaged functional assembly) of one or more associated electronic components and/or one or more associated technology applications, programs, and/or codes. Moreover, in some instances, a "module" or "unit" together with the constituent electronic components and/or associated technology applications/programs/codes may be independently operable and/or may form at least a part of the system architecture. In some embodiments, the term "module" or "unit" as used herein may refer to at least a section of a one or more associated technology applications, programs, and/or codes and/or one or more associated electronic components.

FIG. 2A illustrates a high level process flow 200A for static program code analysis and detection of architectural flaws, in accordance with one embodiment of the present invention. One or more steps described with respect to the high level process flow 200A may be performed by the system 108 and/or more specifically, the code testing unit 158. Through the process flow 200A the system 108 and/or more specifically, the code testing unit 158 are configured to dynamically capture application logs during construction of technology program code and dynamically detect anti-pattern conflicts to remediate defects in the technology program code.

FIG. 2B depicts a schematic representation 200B of non-limiting illustrative examples of application session logs of FIG. 2A, in accordance with one embodiment of the present invention. FIG. 2C depicts a schematic representation 200C of non-limiting illustrative examples of a first execution sequence of FIG. 2A, in accordance with one embodiment of the present invention. FIG. 2D depicts a schematic representation 200D of non-limiting illustrative examples of a layer transition map of FIG. 2A, in accordance with one embodiment of the present invention. The process flow 200A will now be described in conjunction with the non-limiting illustrative examples illustrated in FIGS. 2B-2D.

As illustrated by block 202, the system may receive, via an operative communication channel with a user device, a user request to perform defect analysis of a first technology program code. Here, the user may provide the requisite authorization and permissions for access to, analysis of, and modification of the first technology program code, and associated data and files. The user may provide this user input via the user application 122 described previously.

In response, the system may scan a plurality of application session logs, e.g., a global set, to identify a plurality of first application session logs 220 associated with the first technology program code. The system may collate the plurality of first application session logs 220 associated with the first technology program code. Here, the system may sort, modify the case of, modify the data types of the characters, and/or otherwise modify or arrange the application session logs, in accordance with predetermined collation rules such that the application session logs would be compatible with the subsequent processing and analysis steps.

In some embodiments, the first application session logs 220 are data structures that the user application 122 uses to store data logging user actions and/or application processes conducted via the user application. In some embodiments, the first application session logs 220 are temporarily stored at a memory/repository location only for the duration of a current session, after which they may time out. In other embodiments, the first application session logs 220 are stored at a memory/repository location for an extended time period past the end of a current session As illustrated by FIG. 2B, the first application session logs 220 typically comprise a plurality of log items 222 (e.g., 222a-2221). Each of the plurality of log items 222 (e.g., 222a-2221) may be associated with an action, a task, an input, a request, a processing function, an invocation of an application/function/class/server, and/or the like. Moreover, each of the plurality of log items 222 (e.g., 222a-2221) may comprise alphanumeric text and characters representing sub-components of the log item, such as an associated timestamp, associated server, associated function, associated class, session ID, an associated URL, associated service, and/or the like.

Next, the system may analyze the text of the plurality of log items 222 to detect a plurality of first class files 232 (e.g., class files 232a-232h) in the plurality of first application session logs 220 of the first technology program code, as indicated by block 204. Here, in some embodiments, the system may determine that certain sets of characters refer to first class files 232 or names of the first class files 232 based on identifying predetermined delimiters within a predetermined proximity, based on names of the first class files 232, based on identifying a predetermined syntax, and/or the like. As illustrated by the non-limiting example of FIG. 2B, the system may detect a plurality of first class files 232 comprising "HelloController" class file 232a associated with Class 3 230a, "HelloService" class file 232b associated with Class 5 230b, "ResponseMapper" class file 232c associated with Class 8 230c, "HelloWorldServiceImpl" class file 232d associated with Class 6 230d, "HelloWorldDAOImpl" class 232e associated with Class 7 230e, "RequestReader" class file 232f associated with Class 4 230f, "HelloSession" class file 232g associated with Class 2 230g, and "RestInterceptor" class file 232h associated with Class 1 230h. Here, the system may identify that one or more class files are associated with multiple log items 222.

Typically, the first technology program code is structured such that the program can be executed by commencing execution of a first executable statement, a subsequent executable statement, and so on, until control reaches a stop/termination statement in the program code. This refers to an order or sequence of the execution, i.e., first execution sequence 240 associated with the first technology program code. The system may determine the first execution sequence 240 associated with the first technology program code based on analyzing the plurality of first class files 232 associated with the plurality of first application session logs 220 of the first technology program code, as indicated by block 206. In some embodiments, the system may determine the first execution sequence 240 based on determining an order that would need to followed based on the task type for the program logic, e.g., in the order of a fetch instruction, a decode instruction, read operands, an execute instruction and a store data instruction, and/or the like. FIG. 2C illustrates a non-limiting example of the first execution sequence 240. Here, for example, the system may determine that the classes would be executed in the order of "RestInterceptor" class file 232h associated with Class 1 230h, "HelloSession" class file 232g associated with Class 2 230g, "HelloController" class file 232a associated with Class 3 230a, "RequestReader" class file 232f associated with Class 4 230f, "HelloController" class file 232a associated with Class 3 230a, "HelloService" class file 232b associated with Class 5 230b, "HelloWorldServiceImpl" class file 232d associated with Class 6 230d, "HelloWorldDAOImpl" class 232e associated with Class 7 230e, "HelloWorldServiceImpl" class file 232d associated with Class 6 230d, "ResponseMapper" class file 232c associated with Class 8 230c, "HelloService" class file 232b associated with Class 5 230b, and "HelloController" class file 232a associated with Class 3 230a, in the first execution sequence 240.

Subsequently, the system is structured to map the classes to respective application layers to thereby construct a first layer transition map 260. Here, in some embodiments, the system may first determine a first process function of the one or more process functions associated with each of a plurality of first classes 230 associated with the first technology program code. In this regard, the system may analyze the class file names to determine the particular type of processing task or function or sub-routine (e.g., building, mapping, executing, reading, controlling, etc.) that the associated class is structured to perform. Next, the system may determine a first type of process function associated with the first process function. For example, the system may determine that class file names with words such as "builder", "mapper", "util", and/or the like may be associated with "helper" type process functions. The system may determine for each first class of the plurality of first classes 230 an associated application layer of the one or more application layers 250 based on the associated first type of process function. The one or more application layers 250 may be of entity/business layer type (e.g., having entity/business layer 1, entity/business layer 2, etc.), helper layer type (e.g., having helper layer 1, helper layer 2, etc.), service layer type (e.g., having service layer 1, service layer 2, etc.), database layer type (e.g., having database layer 1, database layer 2, etc.), and/or the like. Continuing with the previous examples, the system may determine that "helper" type process functions (e.g., having class file names with words such as "builder", "mapper", "util", and/or the like) fall under a "Helper" type application layer of the one or more application layers 250. As another example, the system may determine that "service" type process functions (e.g., having class file names with words such as "service", and/or the like) fall under a "Service" type application layer of the one or more application layers 250.

As indicated by block 208, the system may construct a first layer transition map 260 based on mapping each of a plurality of first classes 230 (e.g., classes 230a-230h) associated with the first technology program code to the respective one or more application layers 250 (e.g., layers 250a-250d). Here, the system may first determine the plurality of first classes 230 based on the plurality of first class files 232 associated with the plurality of first application session logs 220 of the first technology program code. The system may then determine a class name for each of the plurality of first classes 230. The system may then determine for each first class of the plurality of first classes 230 an associated application layer of the one or more application layers 250 based on at least the class name, as described above. Subsequently, the system may construct the first layer transition map 260 based on mapping each of the plurality of first classes 230 to one or more application layers 250. Subsequently, the system may transmit the first layer transition map 260 to an anomaly detection engine component 156a. FIG. 2D illustrates a non-limiting example of a first layer transition map 260. Here, "RestInterceptor" class file 232h associated with Class 1 230h, "HelloSession" class file 232g associated with Class 2 230g, "HelloController" class file 232a associated with Class 3 230a are mapped to entity/business type application layer 1 250a, "Request- Reader" class file 232f associated with Class 4 230f, and "ResponseMapper" class file 232c associated with Class 8 230c, are mapped to helper type application layer 2 250b, "HelloService" class file 232b associated with Class 5 230b, "HelloWorldServiceImpl" class file 232d associated with Class 6 230d are mapped to service type application layer 3 250c, and "HelloWorldDAOImpl" class 232e associated with Class 7 230e are mapped to database type application layer 4 250d.

The system may determine, via the anomaly detection engine component 156a, a first pattern associated with the first technology program code. In some embodiments, the first pattern associated with the first technology program code represents relationships and interactions between classes or objects and may take the form of creational patterns, structural patters, behavioral patterns, concurrency patterns and/or the like. The anomaly detection engine component 156a, may then analyze the first pattern associated with the first technology program code to determine whether the first technology program code comprises anomalies, at block 210. Here, in some embodiments, the system may determine a sequence order of each of the plurality of first classes 230 (e.g., the portion of the first execution sequence 240 pertaining to the sequence of classes involved). The system may then validate the sequence order of each of the plurality of first classes 230. Subsequently, the system may determine whether the sequence order of each of the plurality of first classes 230 is compatible with a pre-determined layer transition component associated with the anomaly detection engine component 156a. The pre-determined layer transition component (also referred to as a rules engine) comprises predetermined compatibility rules regarding program code architectural standards, allowed application layer transitions, and/or the like. In other words, the system may validate the sequence order of each of the plurality of first classes 230 and verify whether it is compatible with allowed application layer transitions.

Next at block 212, the system may determine, via the anomaly detection engine component 156a, one or more anomalies associated with the first technology program code in response to detecting that the first pattern is an anti-pattern. The anti-pattern is associated with an architectural defect or flaw in the first technology program code that causes the first pattern associated with the first technology program code to mismatch with predetermined compatibility rules, likely rendering the first technology program code and/or downstream applications/codes to be defective if executed. In some embodiments, the system may detect that the first pattern is the anti-pattern in response to determining that (i) the validation of the sequence order is unsuccessful (e.g., that the current sequence would fail if executed), and (ii) the sequence order is not compatible with the pre-determined layer transition component (e.g., incompatible with predetermined compatibility rules) associated with the anomaly detection engine component 156a. In some embodiments, the system may detect that the first pattern is the anti-pattern in response to determining that the sequence order is not compatible with the pre-determined layer transition component associated with the anomaly detection engine component 156a (e.g., incompatible with predetermined compatibility rules). The system may further classify the one or more architectural anomalies/flaws into levels based on their severity such as level 0, level 1, and/or the like. The system may then transmit, via the anomaly detection engine component 156a, a validation file comprising the one or more architectural anomalies/flaws associated with the first technology program code, as indicated by block 214. The user may then review the one or more anomalies identified in the validation file.

As described above, embodiments of the invention are able to identify architectural anomalies/flaws in the program code by merely processing the application session logs, keeping the analysis nimble and without being resource and time intensive. Moreover, the static program code analysis and detection of architectural flaws described above can be implemented before entire construction process of the program code has been completed, and is structured to preclude compound and cascading flaws/defects/errors in the code that may originate from initial errors. Moreover, the static program code analysis and detection of architectural flaws described above is compatible for testing programs having complex structures that do not lend themselves to the conventional methods, without relying on test cases for testing programs which likely may not help identify the root causes of the anomalies.

In some embodiments, the system is further configured to transmit, via the operative communication channel with the user device, a dynamic notification to the user indicating the one or more anomalies associated with the first technology program code. In response to a defect correction input from the user, the system may initiate correction of the first technology program code by at least modifying first pattern associated with the first technology program code, thereby constructing a corrected first technology program code. Furthermore, the system may perform defect analysis of the corrected first technology program code by performing the preceding steps in blocks 202-212 on the corrected first technology program code in the same manner as described above, to ensure that the corrected first technology program code is not defective. Here, the system may perform iterative corrections until the (i) the validation of the sequence order in the corrected first technology program code is successful (e.g., that the current sequence would not fail if executed), and (ii) the sequence order in the corrected first technology program code is compatible with the pre-determined layer transition component (e.g., incompatible with predetermined compatibility rules) associated with the anomaly detection engine component 156a.

FIG. 3A illustrates a high level process flow 300A for machine learning-based anomaly detection in program code, in accordance with one embodiment of the present invention. One or more steps described with respect to the high level process flow 300A may be performed by the system 108 and/or more specifically, the code testing unit 158. Through the process flow 300A the system 108 and/or more specifically, the code testing unit 158 are configured to dynamically capture application logs during construction of technology program code and dynamically detect anti-pattern conflicts to remediate defects in the technology program code. FIGS. 3B and 3C depicts schematic representations 300B and 330C, respectively, of non-limiting illustrative examples of constructing and training the ML anomaly detection model of FIG. 3A, in accordance with one embodiment of the present invention. The process flow 300A will now be described in conjunction with the illustrative examples illustrated in FIGS. 3B-3C.

As discussed previously, the present invention is structured to construct, train, implement and utilize a machine learning (ML) anomaly detection model, also referred to as a machine learning (ML) anomaly detection model component that is structured to detect architectural flaws in program code based on processing application logs associated with technology program code and determining flow sequences between a plurality of layers of code. Here, the ML anomaly detection model is structured to perform defect analysis of a technology program codes. Specifically, the ML anomaly detection model (also referred to as the ML anomaly detection model component) is structured to predict architecture patterns of the technology program code (e.g., based on associated execution sequence orders), predict mapping of application layers, and further predict anti-patterns by comparing flow sequence between the different layers of code and the closely associated architecture pattern guidelines.

Some of the inputs to the ML anomaly detection model will now be discussed. As detailed previously, each technology program code is associated with a plurality of application session logs, which may be processed, parsed and collated by the system. As discussed previously, the system may analyze the plurality of application session logs to detect a plurality of classes and associated class files in the plurality of application session logs of the technology program code. In other words, the system may determine the classes invoked and their order of execution in the sequence.

"Execution methods" as used herein may refer to a programmed procedure that is defined as part of a class and included in any object of that class. Typically, in object-oriented programming, class-based programming such as Java, a class may comprise objects or class objects. The properties of the object comprise data associated with the object and the execution methods (also referred as "methods" in the art) comprise the behaviors of the object. A class (and/or its object) can have more than one execution methods. Typically, an execution method in an object can only access the data associated with that object. An execution method can be re-used in multiple objects. For example, a method in Java programming sets the behavior of a class object. For example, an object can send a resource value (e.g., account balance) message to another object and the appropriate function is invoked whether the receiving object is a checking account, a savings account, a credit card, a debit card, and/or the like.

The system may further determine execution methods associated with each of the identified classes. The system may map the classes with their respective execution methods. The system may then determine the execution sequences associated with the mapped the classes with their respective execution methods. The system may also extract a plurality of class files associated with the classes of the technology program codes from a repository location. Typically, the execution sequences are associated with the order or sequence of execution of the mapped the class-execution method pairs. The mapped classes, execution methods and execution sequences, and the class files may be provided as an input to the ML anomaly detection model.

The construction of the ML anomaly detection model 156b (also referred to as the ML anomaly detection model component 156b) will now be discussed. The system builds and trains the ML anomaly detection model 156b. The roles that it is structured to fulfill typically occur in three stages. Construction and training of each stage will be discussed in turn below. In the first stage, the ML anomaly detection model 156b is built to and structured to construct an application layer map based on mapping each of the classes associated with the technology program code to one or more application layers. In other words, the ML anomaly detection model 156b is structured to classify an execution method's code into one or more respective layers. During training, data (training execution sequences associated with the training mapped the classes with their respective training execution methods, and the training class files) associated with multiple training program codes may be provided to the ML anomaly detection model 156b. The ML anomaly detection model 156b may be trained to analyze method codes (e.g., comprising the JavaDoc comments associated with the respective training execution method) associated with the training execution methods. Here, the ML anomaly detection model 156b is further trained to read the class files to identify method attributes of the each of the training execution methods. Specifically, the ML anomaly detection model 156b is trained to detect method attributes such as variable types, list of operations used in the execution method, use of any libraries or application programming interfaces (APIs), annotations within the execution method, class package names, class level annotation, incoming request types, outgoing response types of the execution method, and/or the like, in the training data provided. The ML anomaly detection model 156b is trained to employ the determined method attributes in mapping the training class and execution method pairs to their respective application layers. Here, application layers may comprise entity/business type application layer, helper type application layer, service type application layer, database type application layer, presentation type application layer, event processing type application layer, and/or the like. Specifically, the ML anomaly detection model 156b is trained to analyze the identified method attributes and method codes for each training class and execution method pair, and subsequently identify a respective application layer for the training class and execution method pair such that its method attributes and method codes are compatible with the respective application layer.

In the subsequent second stage, the ML anomaly detection model 156b is built to and structured to predict architecture patterns associated with the training technology program codes. Here, the model is structured to determine the architecture pattern associated with the technology program code based on (i) the execution sequence and (ii) the one or more application layers. The ML anomaly detection model 156b is trained to analyze the training class and execution method pairs and their execution sequences, and the mapped application layers predicted by the model in the prior stage, and subsequently identify the most closely matched predetermined architecture patterns based on identifying compatible attributes therebetween. These predetermined architecture patters may comprise layer architecture, even-driven architecture, microkernel architecture, micro services architecture, space-based architecture, and/or the like. The accuracy of the prediction of the closest matched predetermined architecture pattern by the ML anomaly detection model 156b typically improves over training iterations.

Finally, in the third stage, the ML anomaly detection model 156b is built to and structured to predict anti-patterns by comparing flow sequences between the different layers of code and the closely associated architecture pattern guidelines. In other words, the ML anomaly detection model 156b is structured to and trained to determine whether the technology program code is associated with an anti-pattern. As discussed previously, in some embodiments, the ML anomaly detection model 156b is a machine learning model program or a deep learning model program. Here, the ML anomaly detection model 156b is trained to retrieve compatibility rules/guidelines of the predicted closest matched architecture pattern from a pre-determined architecture rule component, and is further trained to identify distinctions between the attributes of training program codes and compatibility guidelines/rules of the predicted closest matched architecture pattern. The ML anomaly detection model 156b is then trained to determine if the identified distinctions are flaws/anomalies that would likely render the program code defective, and hence determine whether the training program code comprises anti-patterns. The ML anomaly detection model 156*b* is trained to determine that the closest matched architecture pattern is an anti-pattern in response to determining that the closest matched architecture pattern and/or the execution sequence is not compatible with compatibility rules/guidelines of the predicted closest matched architecture pattern provided at the pre-determined architecture rule component. Subsequently, the ML anomaly detection model 156*b* is trained to provide an output indicating whether anti-patterns have been identified. Again, the accuracy of the prediction of anti-patterns by the ML anomaly detection model 156*b* typically improves over training iterations.

Once the ML anomaly detection model 156*b* has been built/constructed and trained in the foregoing manner, the trained ML anomaly detection model 156*b*' (also referred to as the trained ML anomaly detection model component 156*b*') can be employed to perform defect analysis of a technology program codes, as will now be described with respect to process flow 300A of FIG. 3A, and the non-limiting schematic first and second stage depictions of the ML anomaly detection model in FIGS. 3B and 3C respectively. The ML anomaly detection model 156*b* may be stored at a cloud memory location and may also be referred to as a ML anomaly detection cloud model 156*b*.

Initially, the system may receive, via an operative communication channel with a user device, a user request to perform defect analysis of a first technology program code, at block 302. Here, the user may provide the requisite authorization and permissions for access to, analysis of, and modification of the first technology program code, and associated data and files. The user may provide this user input via the user application 122 described previously.

In response, the system may read the respective application server logs to determine the classes invoked and their order of execution, e.g., in a manner similar to that described with respect to FIGS. 2A-2D above. Specifically, the system may scan a plurality of application session logs, e.g., a global set, to identify a plurality of first application session logs 220 associated with the first technology program code. The system may collate the plurality of first application session logs 220 associated with the first technology program code. Here, the system may sort, modify the case of, modify the data types of the characters, and/or otherwise modify or arrange the application session logs, in accordance with predetermined collation rules such that the application session logs would be compatible with the subsequent processing and analysis steps.

Next, the system may detect a plurality of first classes 330 (e.g., classes 330*a*-330*c*) invoked in a plurality of first application session logs of the first technology program code based on analyzing the plurality of first application session logs at block 304. The system may read the respective application server logs to determine the classes 330 invoked in a manner similar to that described with respect to FIGS. 2A-2D above. Specifically, the system may analyze the plurality of log items to detect a plurality of first classes 330 and their respective first class files 332. As illustrated by the non-limiting example of FIG. 3B, the system may detect a plurality of first classes 330 comprising class 1 330*a*, class 2 330*c*, class 3 330*b*, and/or the like. The plurality of first classes 330 may be similar to the classes 230 described previously.

The system may then determine first execution methods 360 (e.g., execution methods 360*a*, 360*b*, 360*c*, 360*d*, etc.) associated with the plurality of first classes 330. As discussed previously, "execution methods" as used herein may refer to a programmed procedure that is defined as part of a class and included in any object of that class. The system may further determine execution methods 360 associated with each of the identified plurality of first classes 330. The system may map the plurality of first classes 330 with their respective execution methods 360. Here, the system may analyze data associated with the classes, their objects and/or the like, to determine the respective execution methods 360. As illustrated by the non-limiting example of FIG. 3B, the system may determine the class-execution method pairs, i.e., determine that class 1 330*a* is associated with execution method 4 360*a*, class 2 330*c* is associated with execution method 1 360*d* and execution method 2 360*b*, class 3 330*b* is associated with execution method 2 360*b* and execution method 3 360*c*, and/or the like. The plurality of first classes 330 may be similar to the classes 230 described previously.

As discussed previously, the system may construct a first execution sequence 362 associated with the first technology program code based on (i) the plurality of first classes 330 and (ii) first execution methods 360 (e.g., execution methods 360*a*-360*d*) associated with the plurality of first classes 330, as indicated by block 306. Typically, the first technology program code is structured such that the program can be executed by commencing execution of a first executable statement, a subsequent executable statement, and so on, until control reaches a stop/termination statement in the program code. This refers to an order or sequence of the execution, i.e., first execution sequence associated with the first technology program code. The system may then determine the execution sequence 362 associated with the mapped the classes with their respective execution methods. As discussed with respect to FIGS. 2A-2D previously, typically, the execution sequence 362 is associated with the order or sequence of execution of the mapped the class-execution method pairs. In some embodiments, the system may determine the first execution sequence 362 based on determining an order that would need to followed based on the task type for the program logic, e.g., in the order of a fetch instruction, a decode instruction, read operation, an execute instruction and a store data instruction, and/or the like. A schematic representation of the first execution sequence 362 mapped to the classes 330-execution methods 360 pairs is illustrated in FIG. 3B.

Moreover, the system may extract a plurality of first class files associated with the plurality of first classes 330 of the first technology program code from a first repository location, at block 308. The system may also extract a plurality of class files 332 associated with the classes 330 of the technology program codes from a repository location.

As indicated by block 310, the system may construct and train the anomaly detection model 156*b*' that is structured to (i) construct a first application layer map 370 based on mapping each of the plurality of first classes 330 associated with the first technology program code to one or more application layers, (ii) determine a first architecture pattern 380 associated with the first technology program code, and (iii) determine whether the first technology program code is associated with an anti-pattern, in a manner detailed previously. As discussed previously, in some embodiments, the ML anomaly detection model 156*b*' is a machine learning model program or a deep learning model program.

The system may then transmit the plurality of class files to the trained ML anomaly detection model 156*b*' and trigger the ML anomaly detection model 156*b* to process the plurality of class files, as indicated by block 312. Typically the mapped the classes 330 with their respective execution methods 360, and the class files 332 may be provided as an input to the ML anomaly detection model 156b' and the ML anomaly detection model 156b' may be activated to begin processing the same at block 312, as schematically illustrated by FIG. 3B. Subsequently, the ML anomaly detection model 156b' begins the process of determining whether the first technology program code comprises anti-patterns.

In the first stage, the ML anomaly detection model 156b' constructs an application layer map 370 based on mapping each of the classes 330 associated with the first technology program code to one or more application layers 372, a non-limiting schematic representation of which is illustrated in FIG. 3B. In other words, the ML anomaly detection model 156b' classifies an execution method's code into one or more respective application layers 372. The ML anomaly detection model 156b' analyzes method codes (e.g., comprising the JavaDoc comments associated with the respective execution method) associated with the execution methods 360. Here, the ML anomaly detection model 156b' may further analyze the first class files 332 to identify method attributes of the each of the execution methods 360. Specifically, the ML anomaly detection model 156b' may detect method attributes such as variable types, list of operations used in the execution method, use of any libraries or application programming interfaces (APIs), annotations within the execution method, class package names, class level annotation, incoming request types, outgoing response types of the execution method, and/or the like, in the first technology program code. The ML anomaly detection model 156b' employs the determined method attributes in mapping the class 330 and execution method 360 pairs to their respective application layers 370. Here, application layers 372 may comprise entity/business type application layer, helper type application layer, service type application layer, database type application layer, presentation type application layer, event processing type application layer, and/or the like.

Specifically, the ML anomaly detection model 156b' may analyze the identified method attributes and method codes for each class 330 and execution method 360 pair, and subsequently identify a respective application layer 372 for the class 330 and execution method 360 pair such that its method attributes and method codes are compatible with the respective application layer 372. As illustrated by the non-limiting schematic representation of FIG. 3B, the ML anomaly detection model 156b' may determine that class 1 330-execution method 4 360a pair (having execution sequence 262 position 1) is associated with application layer 1 372a (e.g., a presentation layer), class 3 330b-execution method 2 360 pair (having execution sequence 262 position 4) is associated with application layer 2 372b (e.g., a service layer), class 3 330b-execution method 3 360c pair (having execution sequence 262 position 3) is associated with application layer 3 372c (e.g., a helper layer), class 2 330c-execution method 1 360d pair (having execution sequence 262 position 5) is associated with application layer 4 372d (e.g., a database layer), and class 2 330c-execution method 2 360b pair (having execution sequence 262 position 2) is associated with application layer 5 372e (e.g., a business layer), and/or the like, to thereby construct a first application layer map 370.

In the subsequent second stage, the ML anomaly detection model 156b' determines a first architecture pattern 380 associated with the first technology program code, a non-limiting schematic representation of which is illustrated in FIG. 3C. Here, the ML anomaly detection model 156b' determines the first architecture pattern 380 associated with the first technology program code based on (i) the first execution sequence 362 associated with the first technology program code and (ii) the one or more application layers 372. The ML anomaly detection model 156b' analyzes the class 330-execution method 360 pairs and their execution sequences 362, and the mapped application layers 372 determined by the model in the prior stage, and subsequently identifies the first architectural pattern 380, i.e., the most closely matched predetermined architecture pattern (of a plurality of predetermined patterns) based on identifying compatible attributes therebetween. These predetermined architecture patters may comprise layer architecture, even-driven architecture, microkernel architecture, micro services architecture, space-based architecture, and/or the like.

Finally, in the third stage, at block 314, the ML anomaly detection model 156b' may determine that the first technology program code is associated with an anti-pattern, wherein the anti-pattern is associated with a defect. The anti-pattern is associated with an architectural defect or flaw in the first technology program code that causes the first pattern associated with the first technology program code to mismatch with predetermined compatibility rules, likely rendering the first technology program code and/or downstream applications/codes to be defective if executed. In other words, the ML anomaly detection model 156b' determines whether the first technology program code is associated with an anti-pattern. Here, the ML anomaly detection model 156b' may retrieve compatibility rules/guidelines of the first architectural pattern 380 (e.g., the predicted closest matched architecture pattern) from a pre-determined architecture rule component. The ML anomaly detection model 156b' may identify distinctions between the attributes of the first technology program code and compatibility guidelines/rules of the first architectural pattern 380. The ML anomaly detection model 156b then determines whether the identified distinctions are flaws/anomalies that would likely render the program code defective, and hence determine whether the first technology program code comprises anti-patterns. The ML anomaly detection model 156b' determines that the first architectural pattern 380 is an anti-pattern in response to determining that the first architectural pattern 380 and/or the execution sequence 362 is not compatible with compatibility rules/guidelines of the first architectural pattern 380 provided at the pre-determined architecture rule component.

The ML anomaly detection model 156b' may then transmit an anti-pattern data file associated with the anti-pattern of the first technology program code.

As described above, embodiments of the invention are able to identify architectural anomalies/flaws in the program code without being resource and time intensive. Moreover, the machine learning-based anomaly detection in program code described above can be implemented while the construction is pending, before entire construction process of the program code has been completed, and is structured to preclude compound and cascading flaws/defects/errors in the code that may originate from initial errors. Moreover, the machine learning-based anomaly detection in program code described above is compatible for testing programs having complex structures that do not lend themselves to the conventional methods.

In some embodiments, the system is further configured to transmit, via the operative communication channel with the user device, a dynamic notification to the user indicating the anti-pattern associated with the first technology program code. In response to a defect correction input from the user, the system may initiate correction of the first technology program code by at least modifying first architecture pattern associated with the first technology program code, thereby constructing a corrected first technology program code. Furthermore, the system may perform defect analysis of the corrected first technology program code by performing the preceding steps in blocks 302-314 on the corrected first technology program code in the same manner as described above, to ensure that the corrected first technology program code is not defective. Here, the system may perform iterative corrections until the ML anomaly detection model 156b' does not detect any anti-patterns in the corrected first technology program code.

FIG. 4 illustrates a high level process flow 400 for active detection and mitigation of anomalies in program code construction interfaces, in accordance with one embodiment of the present invention. One or more steps described with respect to the high level process flow 400 may be performed by the system 108 and/or more specifically, the code testing unit 158. Through the process flow 400 the system 108 and/or more specifically, the code testing unit 158 are configured to dynamically capture application logs during construction of technology program code and dynamically detect anti-pattern conflicts to remediate defects in the technology program code.

Initially, the system may receive, via an operative communication channel with a user device, a user request to perform defect analysis of a first technology program code, at block 402. Here, the user may provide the requisite authorization and permissions for access to, analysis of, and modification of the first technology program code, and associated data and files. The user may provide this user input via the user application 122 described previously.

In response, the system may activate a machine learning (ML) anomaly detection plug-in component, for dynamically analyzing the first technology program code being constructed in the user coding interface, as indicated by block 404. The ML anomaly detection plug-in component 124 is structured to be activated within the user coding interface of the user application 122. Here, the ML anomaly detection plug-in component 124 adds new functionality to the user application 122, and may also control certain functions of the user application 122, while retaining the user within the user coding interface of the user application 122. The testing system 108 (e.g., via its processing device 148 upon executing computer readable instructions 154) may transmit, store, install, run, execute, trigger, and/or otherwise control a ML anomaly detection plug-in component 124 at the user device 122.

The ML anomaly detection plug-in component 124 may read the respective application server logs to determine the classes invoked and their order of execution, e.g., in a manner similar to that described with respect to FIGS. 2A-2D and 3A-3C above. Specifically, the ML anomaly detection plug-in component 124 may scan a plurality of application session logs, e.g., a global set, to identify a plurality of first application session logs 220 associated with the first technology program code. The ML anomaly detection plug-in component 124 may collate the plurality of first application session logs 220 associated with the first technology program code. Here, the ML anomaly detection plug-in component 124 may sort, modify the case of, modify the data types of the characters, and/or otherwise modify or arrange the application session logs, in accordance with predetermined collation rules such that the application session logs would be compatible with the subsequent processing and analysis steps.

Next, the ML anomaly detection plug-in component 124 may detect a plurality of first classes 330 (e.g., classes 330a-330c) invoked in a plurality of first application session logs of the first technology program code based on analyzing the plurality of first application session logs. The ML anomaly detection plug-in component 124 may read the respective application server logs to determine the classes 330 invoked in a manner similar to that described with respect to FIGS. 2A-2D and 3A-3C above. Specifically, the ML anomaly detection plug-in component 124 may analyze the plurality of log items to detect a plurality of first classes 330 and their respective first class files 332.

The ML anomaly detection plug-in component 124 may then determine first execution methods 360 (e.g., execution methods 360a, 360b, 360c, 360d, etc.) associated with the plurality of first classes 330. As discussed previously, "execution methods" as used herein may refer to a programmed procedure that is defined as part of a class and included in any object of that class. The system may further determine execution methods 360 associated with each of the identified plurality of first classes 330. The ML anomaly detection plug-in component 124 may map the plurality of first classes 330 with their respective execution methods 360. Here, the system may analyze data associated with the classes, their objects and/or the like, to determine the respective execution methods 360.

As discussed previously, the ML anomaly detection plug-in component 124 may construct a first execution sequence 362 associated with the first technology program code based on (i) the plurality of first classes 330 and (ii) first execution methods 360 (e.g., execution methods 360a-360d) associated with the plurality of first classes 330. Typically, the first technology program code is structured such that the program can be executed by commencing execution of a first executable statement, a subsequent executable statement, and so on, until control reaches a stop/termination statement in the program code. This refers to an order or sequence of the execution, i.e., first execution sequence associated with the first technology program code. The ML anomaly detection plug-in component 124 may then determine the execution sequence 362 associated with the mapped the classes with their respective execution methods. As discussed with respect to FIGS. 2A-2D and 3A-3C previously, typically, the execution sequence 362 is associated with the order or sequence of execution of the mapped the class-execution method pairs. In some embodiments, the system may determine the first execution sequence 362 based on determining an order that would need to followed based on the task type for the program logic, e.g., in the order of a fetch instruction, a decode instruction, read operation, an execute instruction and a store data instruction, and/or the like.

Moreover, the ML anomaly detection plug-in component 124 may extract a plurality of first class files associated with the plurality of first classes 330 of the first technology program code from a first repository location. The ML anomaly detection plug-in component 124 and/or the system may also extract a plurality of class files 332 associated with the classes 330 of the technology program codes from a repository location.

The system may construct and train the anomaly detection model 156b' that is structured to (i) construct a first application layer map 370 based on mapping each of the plurality of first classes 330 associated with the first technology program code to one or more application layers, (ii) determine a first architecture pattern 380 associated with the first technology program code, and (iii) determine whether the first technology program code is associated with an anti-pattern, in a manner detailed previously. As discussed previously, in some embodiments, the ML anomaly detection model 156b' is a machine learning model program or a deep learning model program.

The system may then transmit, from the ML anomaly detection plug-in component, the plurality of first classes, the first execution methods associated with the plurality of first classes, the first execution sequence and the plurality of first class files to a machine learning (ML) anomaly detection model component 156b' and trigger the ML anomaly detection model 156b' to determine anti-patterns associated with the first technology program code, as indicated by block 406. Typically the mapped the classes 330 with their respective execution methods 360, and the class files 332 may be provided as an input to the ML anomaly detection model 156b' and the ML anomaly detection model 156b' may be activated to begin processing the same. Subsequently, the ML anomaly detection model 156b' begins the process of determining whether the first technology program code comprises anti-patterns.

In the first stage, as indicated by block 408, the ML anomaly detection model 156b' constructs an application layer map 370 based on mapping each of the classes 330 associated with the first technology program code to one or more application layers 372, a non-limiting schematic representation of which is illustrated in FIG. 3B. In other words, the ML anomaly detection model 156b' classifies an execution method's code into one or more respective application layers 372. The ML anomaly detection model 156b' analyzes method codes (e.g., comprising the JavaDoc comments associated with the respective execution method) associated with the execution methods 360. Here, the ML anomaly detection model 156b' may further analyze the first class files 332 to identify method attributes of the each of the execution methods 360. Specifically, the ML anomaly detection model 156b' may detect method attributes such as variable types, list of operations used in the execution method, use of any libraries or application programming interfaces (APIs), annotations within the execution method, class package names, class level annotation, incoming request types, outgoing response types of the execution method, and/or the like, in the first technology program code. The ML anomaly detection model 156b' employs the determined method attributes in mapping the class 330 and execution method 360 pairs to their respective application layers 370. Here, application layers 372 may comprise entity/business type application layer, helper type application layer, service type application layer, database type application layer, presentation type application layer, event processing type application layer, and/or the like.

Specifically, the ML anomaly detection model 156b' may analyze the identified method attributes and method codes for each class 330 and execution method 360 pair, and subsequently identify a respective application layer 372 for the class 330 and execution method 360 pair such that its method attributes and method codes are compatible with the respective application layer 372.

In the subsequent second stage, the ML anomaly detection model 156b' determines a first architecture pattern 380 associated with the first technology program code. Here, the ML anomaly detection model 156b' determines the first architecture pattern 380 associated with the first technology program code based on (i) the first execution sequence 362 associated with the first technology program code and (ii) the one or more application layers 372. The ML anomaly detection model 156b' analyzes the class 330-execution method 360 pairs and their execution sequences 362, and the mapped application layers 372 determined by the model in the prior stage, and subsequently identifies the first architectural pattern 380, i.e., the most closely matched predetermined architecture pattern (of a plurality of predetermined patterns) based on identifying compatible attributes therebetween. These predetermined architecture patters may comprise layer architecture, even-driven architecture, microkernel architecture, micro services architecture, space-based architecture, and/or the like.

Finally, as indicated by block 410, in the third stage, the ML anomaly detection model 156b' may identify one or more first flaws in the first technology program code based on at least determining anti-patterns associated with the first technology program code. In some embodiments, the ML anomaly detection model component 156b' may determine that the first architecture pattern associated with the first technology program code is an anti-pattern in response to determining that the first architecture pattern and/or the first execution sequence is not compatible with a pre-determined architecture rule component, wherein the one or more first flaws are associated with the anti-pattern. In some embodiments, the ML anomaly detection model component 156b' may determine that the first technology program code is associated with an anti-pattern, wherein the anti-pattern is associated with a defect. The anti-pattern is associated with an architectural defect or flaw in the first technology program code that causes the first pattern associated with the first technology program code to mismatch with predetermined compatibility rules, likely rendering the first technology program code and/or downstream applications/codes to be defective if executed. In other words, the ML anomaly detection model 156b' determines whether the first technology program code is associated with an anti-pattern. Here, the ML anomaly detection model 156b' may retrieve compatibility rules/guidelines of the first architectural pattern 380 (e.g., the predicted closest matched architecture pattern) from a pre-determined architecture rule component. The ML anomaly detection model 156b' may identify distinctions between the attributes of the first technology program code and compatibility guidelines/rules of the first architectural pattern 380. The ML anomaly detection model 156b then determines whether the identified distinctions are flaws/anomalies that would likely render the program code defective, and hence determine whether the first technology program code comprises anti-patterns. The ML anomaly detection model 156b' determines that the first architectural pattern 380 is an anti-pattern in response to determining that the first architectural pattern 380 and/or the execution sequence 362 is not compatible with compatibility rules/guidelines of the first architectural pattern 380 provided at the pre-determined architecture rule component. The ML anomaly detection model 156b' may then transmit an anti-pattern data file associated with the anti-pattern and flaws of the first technology program code to the ML anomaly detection plug-in component 124.

As indicated by block 412, the ML anomaly detection plug-in component 124 may then modify the user coding interface to embed first interface elements associated with the one or more first flaws in the first technology program code detected by the ML anomaly detection model component, e.g., within a current user view zone. The first interface elements may be structured to highlight the portion of the first technology program code that is associated with the one or more first flaws, and/or provide data regarding the one or more flaws. The first interface elements may comprise a textual element, an image element, a pop-up, a drop-down menu, and/or the like. The ML anomaly detection plug-in component 124 may further obfuscate or otherwise blur or defocus or overlay opaque elements on the portions of user coding interface that are not associated with the first interface elements.

As described above, embodiments of the invention are able to identify architectural anomalies/flaws in the program code without being resource and time intensive. Moreover, the machine learning-based anomaly detection in program code described above can be implemented while the construction is pending, before entire construction process of the program code has been completed, and is structured to preclude compound and cascading flaws/defects/errors in the code that may originate from initial errors. Moreover, the machine learning-based anomaly detection in program code described above is compatible for testing programs having complex structures that do not lend themselves to the conventional methods.

In some embodiments, the system is further configured to transmit, via the operative communication channel with the user device, a dynamic notification to the user indicating the anti-pattern associated with the first technology program code. In response to a defect correction input from the user, the system may initiate correction of the first technology program code by at least modifying first architecture pattern associated with the first technology program code, thereby constructing a corrected first technology program code. Furthermore, the system may perform defect analysis of the corrected first technology program code by performing the preceding steps in blocks 404-412 on the corrected first technology program code in the same manner as described above, to ensure that the corrected first technology program code is not defective. Here, the system may perform iterative corrections until the ML anomaly detection model 156b' does not detect any anti-patterns in the corrected first technology program code.

As discussed previously, the dynamic nature of the active detection and mitigation of anomalies in program code construction interfaces described above lends itself to real-time defect detection. In some embodiments, the ML anomaly detection plug-in component 124 is active and running until the construction of the first technology program code is completed. As such, the system may repeat the preceding steps in blocks 404-412 until the construction of the first technology program code is completed. In this regard, the ML anomaly detection plug-in component 124 may detect that the user had added new content (or modified existing content) to the first technology program code since the first time interval when the step 412 was completed/implemented. The ML anomaly detection plug-in component 124 may detect a plurality of second application session logs associated with an augmented portion (new or modified portion) of the first technology program code inputted by the user in the current session of the user coding interface at a second time interval following the first time interval. The ML anomaly detection plug-in component 124 may extract a plurality of second class files associated with the detected plurality of second application session logs. The ML anomaly detection plug-in component 124 may then transmit the plurality of second application session logs and the plurality of second class files to the ML anomaly detection model 156b, which may perform the three-stage processing for anti-pattern detection described previously. The ML anomaly detection plug-in component 124 may then receive one or more second flaws in the first technology program code at the ML anomaly detection plug-in component. Subsequently, the ML anomaly detection plug-in component 124 may then modify the user coding interface to embed additional interface elements associated with the one or more second flaws in the first technology program code detected by the ML anomaly detection model component.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. Patent Application Ser. No. | Title | Filed On |
|---|---|---|
| 17/531,099 | ELECTRONIC SYSTEM FOR MACHINE LEARNING BASED ANOMALY DETECTION IN PROGRAM CODE | Nov. 19, 2021 |
| 17/531,051 | DYNAMIC SYSTEM FOR ACTIVE DETECTION AND MITIGATION OF ANOMALIES IN PROGRAM CODE CONSTRUCTION INTERFACES | Nov. 19, 2021 |

The invention claimed is:

1. A system for static program code analysis and detection of architectural flaws, wherein the system provides a rule-based anomaly detection engine structured to capture application logs during construction of technology program code and dynamically detect anti-pattern conflicts to remediate defects in the technology program code, the system comprising:
   at least one memory device with computer-readable program code stored thereon;
   at least one communication device;
   at least one processing device operatively coupled to the at least one memory device and the at least one communication device, wherein executing the computer-readable code is configured to cause the at least one processing device to:
      receive, via an operative communication channel with a user device, a user request to perform defect analysis of a first technology program code;
      scan a plurality of application session logs to identify a plurality of first application session logs associated with the first technology program code;
      detect a plurality of first class files in the plurality of first application session logs of the first technology program code based on analyzing the plurality of first application session logs;
      determine a first execution sequence associated with the first technology program code based on analyzing the plurality of first class files associated with the plurality of first application session logs of the first technology program code;
      construct a first layer transition map based on mapping each of a plurality of first classes associated with the first technology program code to one or more application layers;
      transmit the first layer transition map to an anomaly detection engine component;
      analyze, via the anomaly detection engine component, a first pattern associated with the first technology program code to determine whether the first technology program code comprises anomalies;
      determine, via the anomaly detection engine component, one or more anomalies associated with the first technology program code in response to detecting that the first pattern is an anti-pattern, wherein the anti-pattern is associated with a defect; and
      transmit, via the anomaly detection engine component, a validation file comprising the one or more anomalies associated with the first technology program code.

2. The system of claim 1, wherein executing the computer-readable code is configured to cause the at least one processing device to collate the plurality of first application session logs associated with the first technology program code.

3. The system of claim 1, wherein constructing the first layer transition map further comprises:
   determining the plurality of first classes based on the plurality of first class files associated with the plurality of first application session logs of the first technology program code;
   determining a class name for each of the plurality of first classes;
   determining for each first class of the plurality of first classes an associated application layer of the one or more application layers based on at least the class name; and
   constructing the first layer transition map based on mapping each of the plurality of first classes to one or more application layers.

4. The system of claim 1, wherein the plurality of first class files are associated with the plurality of first classes of the first technology program code.

5. The system of claim 1, wherein executing the computer-readable code is configured to cause the at least one processing device to determine, via the anomaly detection engine component, a first pattern associated with the first technology program code.

6. The system of claim 1, wherein analyzing the first pattern associated with the first technology program code further comprises:
   determining a sequence order of each of the plurality of first classes; and
   validating the sequence order of each of the plurality of first classes.

7. The system of claim 1, wherein determining the one or more anomalies associated with the first technology program code further comprises:
   validating a sequence order of each of the plurality of first classes; and
   determining whether the sequence order of each of the plurality of first classes is compatible with a pre-determined layer transition component associated with the anomaly detection engine component.

8. The system of claim 7, wherein determining the one or more anomalies associated with the first technology program code further comprises:
   detecting that the first pattern is the anti-pattern in response to determining that (i) the validation of the sequence order is unsuccessful, and (ii) the sequence order is not compatible with the pre-determined layer transition component associated with the anomaly detection engine component.

9. The system of claim 7, wherein determining the one or more anomalies associated with the first technology program code further comprises:
   detecting that the first pattern is the anti-pattern in response to determining that the sequence order is not compatible with the pre-determined layer transition component associated with the anomaly detection engine component.

10. The system of claim 1, wherein executing the computer-readable code is configured to cause the at least one processing device to:
    transmit, via the operative communication channel with the user device, a dynamic notification to the user indicating the one or more anomalies associated with the first technology program code;
    in response to a defect correction input from the user, initiate correction of the first technology program code by at least modifying first pattern associated with the first technology program code, thereby constructing a corrected first technology program code; and
    perform defect analysis of the first technology program code.

11. The system of claim 1, wherein executing the computer-readable code is configured to cause the at least one processing device to:
    determine a first process function of the one or more process functions associated with each of a plurality of first classes associated with the first technology program code;
    determine a first type of process function associated with the first process function; and
    determine for each first class of the plurality of first classes an associated application layer of the one or more application layers based on the associated first type of process function.

12. A computer program product for static program code analysis and detection of architectural flaws, wherein the computer program product provides a rule-based anomaly detection engine structured to capture application logs during construction of technology program code and dynamically detect anti-pattern conflicts to remediate defects in the technology program code, the computer program product comprising a non-transitory computer-readable storage medium having computer-executable instructions to:
    receive, via an operative communication channel with a user device, a user request to perform defect analysis of a first technology program code;
    scan a plurality of application session logs to identify a plurality of first application session logs associated with the first technology program code;
    detect a plurality of first class files in the plurality of first application session logs of the first technology program code based on analyzing the plurality of first application session logs;
    determine a first execution sequence associated with the first technology program code based on analyzing the plurality of first class files associated with the plurality of first application session logs of the first technology program code;
    construct a first layer transition map based on mapping each of a plurality of first classes associated with the first technology program code to one or more application layers;
    transmit the first layer transition map to an anomaly detection engine component;
    analyze, via the anomaly detection engine component, a first pattern associated with the first technology program code to determine whether the first technology program code comprises anomalies;
    determine, via the anomaly detection engine component, one or more anomalies associated with the first technology program code in response to detecting that the first pattern is an anti-pattern, wherein the anti-pattern is associated with a defect; and
    transmit, via the anomaly detection engine component, a validation file comprising the one or more anomalies associated with the first technology program code.

13. The computer program product of claim 12, wherein constructing the first layer transition map further comprises:
    determining the plurality of first classes based on the plurality of first class files associated with the plurality of first application session logs of the first technology program code;
    determining a class name for each of the plurality of first classes;
    determining for each first class of the plurality of first classes an associated application layer of the one or more application layers based on at least the class name; and
    constructing the first layer transition map based on mapping each of the plurality of first classes to one or more application layers.

14. The computer program product of claim 12, wherein the plurality of first class files are associated with the plurality of first classes of the first technology program code.

15. The computer program product of claim 12, wherein determining the one or more anomalies associated with the first technology program code further comprises:

validating a sequence order of each of the plurality of first classes; and determining whether the sequence order of each of the plurality of first classes is compatible with a pre-determined layer transition component associated with the anomaly detection engine component.

16. The computer program product of claim 15, wherein determining the one or more anomalies associated with the first technology program code further comprises:

detecting that the first pattern is the anti-pattern in response to determining that the sequence order is not compatible with the pre-determined layer transition component associated with the anomaly detection engine component.

17. A method for static program code analysis and detection of architectural flaws, wherein the method provides a rule-based anomaly detection engine structured to capture application logs during construction of technology program code and dynamically detect anti-pattern conflicts to remediate defects in the technology program code, the method comprising:

receiving, via an operative communication channel with a user device, a user request to perform defect analysis of a first technology program code;

scanning a plurality of application session logs to identify a plurality of first application session logs associated with the first technology program code;

detecting a plurality of first class files in the plurality of first application session logs of the first technology program code based on analyzing the plurality of first application session logs;

determining a first execution sequence associated with the first technology program code based on analyzing the plurality of first class files associated with the plurality of first application session logs of the first technology program code;

constructing a first layer transition map based on mapping each of a plurality of first classes associated with the first technology program code to one or more application layers;

transmitting the first layer transition map to an anomaly detection engine component;

analyzing, via the anomaly detection engine component, a first pattern associated with the first technology program code to determine whether the first technology program code comprises anomalies;

determining, via the anomaly detection engine component, one or more anomalies associated with the first technology program code in response to detecting that the first pattern is an anti-pattern, wherein the anti-pattern is associated with a defect; and transmitting, via the anomaly detection engine component, a validation file comprising the one or more anomalies associated with the first technology program code.

18. The method of claim 17, wherein constructing the first layer transition map further comprises:

determining the plurality of first classes based on the plurality of first class files associated with the plurality of first application session logs of the first technology program code;

determining a class name for each of the plurality of first classes;

determining for each first class of the plurality of first classes an associated application layer of the one or more application layers based on at least the class name; and constructing the first layer transition map based on mapping each of the plurality of first classes to one or more application layers.

19. The method of claim 17, wherein determining the one or more anomalies associated with the first technology program code further comprises:

validating a sequence order of each of the plurality of first classes; and determining whether the sequence order of each of the plurality of first classes is compatible with a pre-determined layer transition component associated with the anomaly detection engine component.

20. The method of claim 19, wherein determining the one or more anomalies associated with the first technology program code further comprises:

detecting that the first pattern is the anti-pattern in response to determining that the sequence order is not compatible with the pre-determined layer transition component associated with the anomaly detection engine component.

* * * * *